(12) United States Patent
Shan et al.

(10) Patent No.: US 8,476,393 B2
(45) Date of Patent: *Jul. 2, 2013

(54) ETHYLENE/α-OLEFIN INTERPOLYMERS CONTAINING LOW CRYSTALLINITY HARD BLOCKS

(75) Inventors: Colin Li Pi Shan, Pearland, TX (US); Roger L. Kuhlman, Lake Jackson, TX (US); Gary L. Rath, Pearland, TX (US); Pamela J. Kenny, Lake Jackson, TX (US); Morgan M. Hughes, Angleton, TX (US); Rongjuan Cong, Lake Jackson, TX (US)

(73) Assignee: Dow Global Technologies, LLC, Midland, MI (US)

( * ) Notice: Subject to any disclaimer, the term of this patent is extended or adjusted under 35 U.S.C. 154(b) by 604 days.

This patent is subject to a terminal disclaimer.

(21) Appl. No.: 12/668,794

(22) PCT Filed: Jul. 14, 2008

(86) PCT No.: PCT/US2008/069964
§ 371 (c)(1),
(2), (4) Date: Jan. 12, 2010

(87) PCT Pub. No.: WO2009/012215
PCT Pub. Date: Jan. 22, 2009

(65) Prior Publication Data
US 2010/0197880 A1    Aug. 5, 2010

Related U.S. Application Data

(60) Provisional application No. 60/949,670, filed on Jul. 13, 2007.

(51) Int. Cl.
C08F 210/00 (2006.01)
C08F 210/02 (2006.01)

(52) U.S. Cl.
USPC ............................................... 526/348

(58) Field of Classification Search
USPC ............................................... 526/348
See application file for complete search history.

(56) References Cited

U.S. PATENT DOCUMENTS

| | | | |
|---|---|---|---|
| 4,507,515 A | 3/1985 | Johnston et al. | |
| 4,762,890 A | 8/1988 | Strait et al. | |
| 4,792,595 A | 12/1988 | Cozewith et al. | |
| 4,900,461 A | 2/1990 | Ver Strate et al. | |
| 4,927,888 A | 5/1990 | Strait et al. | |
| 4,950,541 A | 8/1990 | Tabor et al. | |
| 5,401,427 A | 3/1995 | Chung et al. | |
| 5,733,980 A * | 3/1998 | Cozewith et al. | 525/314 |
| 5,798,420 A | 8/1998 | Cozewith et al. | |
| 6,268,444 B1 | 7/2001 | Klosin et al. | |
| 6,953,764 B2 | 10/2005 | Frazier et al. | |
| 7,053,153 B2 | 5/2006 | Schauder | |
| 7,355,089 B2 * | 4/2008 | Chang et al. | 604/358 |
| 7,608,668 B2 * | 10/2009 | Shan et al. | 525/240 |
| 7,714,071 B2 | 5/2010 | Hoenig et al. | |
| 2003/0204017 A1 | 10/2003 | Stevens et al. | |
| 2004/0010103 A1 | 1/2004 | Boussie et al. | |
| 2006/0199907 A1 * | 9/2006 | Chang et al. | 525/191 |
| 2006/0199930 A1 | 9/2006 | Shan et al. | |
| 2006/0211819 A1 | 9/2006 | Hoenig et al. | |
| 2010/0197540 A1 | 8/2010 | Shan et al. | |
| 2010/0197541 A1 | 8/2010 | Shan et al. | |
| 2010/0197864 A1 | 8/2010 | Shan et al. | |

FOREIGN PATENT DOCUMENTS

| | | |
|---|---|---|
| EP | 1178102 A1 | 2/2002 |
| WO | 9216567 A1 | 10/1992 |
| WO | 9216568 A1 | 10/1992 |
| WO | 03040195 | 5/2003 |
| WO | 03/051935 A1 | 6/2003 |
| WO | 2004024740 | 3/2004 |
| WO | 2005/090425 A1 | 9/2005 |
| WO | 2005/090426 A1 | 9/2005 |
| WO | 2005/090427 A1 | 9/2005 |
| WO | 2006/102146 A2 | 9/2006 |
| WO | 2006/102153 A1 | 9/2006 |

OTHER PUBLICATIONS

US file history for US Patent Application Publication No. 2010-0197540.
US file history for US Patent Application Publication No. 2010-0197541.
US file history for US Patent Application Publication No. 2010-0197864.
Arriola et al., "Catalytic Production of Olefin Block Copolymers via Chain Shuttling Polymerization," Science 312 (2006).
International Search Report and Written Opinion issued in PCT/US08/69964, dated Oct. 1, 2008.

* cited by examiner

Primary Examiner — Rip A. Lee

(57) ABSTRACT

The invention is related to an ethylene/α-olefin interpolymer having at least a hard segment and at least a soft segment. The soft segment contains a higher amount of comonomers than the hard segment. The hard segment has low crystallinity. The copolymer has a number of unique characteristics disclosed herein. ethylene/α-olefin interpolymers containing low crystallinity hard blocks.

8 Claims, 3 Drawing Sheets

ETHYLENE/α-OLEFIN INTERPOLYMERS CONTAINING LOW CRYSTALLINITY HARD BLOCKS

CROSS REFERENCE TO RELATED APPLICATIONS

This application claims priority to U.S. Provisional Application No. 60/949,670, filed on Jul. 13, 2007, which is herein incorporated by reference in its entirety. This application is related to the following US applications, all filed provisionally, and concurrent with the priority application and having Ser. No. 60/949,698; Ser. No. 60/949,690 and Ser. No. 60/949,702, all of which are herein incorporated by reference.

FIELD OF THE INVENTION

This invention relates to ethylene/α-olefin interpolymers comprising low crystallinity hard blocks.

BACKGROUND OF THE INVENTION

Block copolymers comprise sequences ("blocks") of the same monomer unit, covalently bound to sequences of unlike type. The blocks can be connected in a variety of ways, such as A-B in diblock and A-B-A triblock structures, where A represents one block and B represents a different block. In a multi-block copolymer, A and B can be connected in a number of different ways and be repeated multiply. It may further comprise additional blocks of different types. Multi-block copolymers can be either linear multi-block or multi-block star polymers (in which all blocks bond to the same atom or chemical moiety).

A block copolymer is created when two or more polymer molecules of different chemical composition are covalently bonded in an end-to-end fashion. While a wide variety of block copolymer architectures are possible, most block copolymers involve the covalent bonding of hard plastic blocks, which are substantially crystalline or glassy, to elastomeric blocks forming thermoplastic elastomers. Other block copolymers, such as rubber-rubber (elastomer-elastomer), glass-glass, and glass-crystalline block copolymers, are also possible and may have commercial importance.

One method to make block copolymers is to produce a "living polymer". Unlike typical Ziegler-Natta polymerization processes, living polymerization processes involve only initiation and propagation steps and essentially lack chain terminating side reactions. This permits the synthesis of predetermined and well-controlled structures desired in a block copolymer. A polymer created in a "living" system can have a narrow or extremely narrow distribution of molecular weight and be essentially monodisperse (i.e., the molecular weight distribution is essentially one). Living catalyst systems are characterized by an initiation rate which is on the order of or exceeds the propagation rate, and the absence of termination or transfer reactions. In addition, these catalyst systems are characterized by the presence of a single type of active site. To produce a high yield of block copolymer in a polymerization process, the catalyst must exhibit living characteristics to a substantial extent.

Butadiene-isoprene block copolymers have been synthesized via anionic polymerization using the sequential monomer addition technique. In sequential addition, a certain amount of one of the monomers is contacted with the catalyst. Once a first such monomer has reacted to substantial extinction forming the first block, a certain amount of the second monomer or monomer species is introduced and allowed to react to form the second block. The process may be repeated using the same or other anionically polymerizable monomers. However, ethylene and other α-olefins, such as propylene, butene, 1-octene, etc., are not directly block polymerizable by anionic techniques.

It would be useful to produce block copolymers which are based on ethylene and α-olefins and have low crystallinity hard blocks.

SUMMARY OF INVENTION

The invention provides an ethylene/α-olefin interpolymer comprising a hard segment and a soft segment, wherein the ethylene/α-olefin interpolymer:

(a) has a Mw/Mn from about 1.7 to about 3.5;

(b) has an ethylene content in the hard segment in the range of from 60 wt % to 95 wt % based on based on total monomer content in hard segment;

(c) (i) has a hard segment in an amount of at least 40%, at least one melting point, Tm, in degrees Celsius and an amount of ethylene in weight percent, wt % $C_2$, wherein the numerical values of Tm and wt % $C_2$ correspond to the relationship:

$$90° C. \geq Tm \geq 4.1276(\text{wt \%} C_2) - 244.76; \text{ or}$$

(ii) has a hard segment composition of less than 40%, at least one melting point, Tm, in degrees Celsius and an amount of ethylene in weight percent, wt % $C_2$, wherein the numerical values of Tm and wt % $C_2$ correspond to the relationship:

$$80° C. \geq Tm \leq 4.1276(\text{wt \%} C_2) - 264.95; \text{ or}$$

(iii) is characterized by an average block index greater than zero and up to about 1.0 and a molecular weight distribution, $M_w/M_n$, greater than about 1.3; or (iv) has a molecular fraction which elutes between 0° C. and 130° C. when fractionated using low temperature TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer; or (v) has a relationship between ethylene content in wt % and log molecular weight such that a line plotted of ethylene content vs log molecular weight as measured by GPC-IR has an absolute slope, m, of equal to or less than 4; and, (d) has a turbidity measurement of a 1.0 wt % solution of the ethylene/α-olefin interpolymer in oil or a 1.5 wt % solution in dodecane of less than or equal to that of a comparable copolymer wherein the comparable copolymer has the same DSC enthalpy (J/g) at greater than 55° C. within ±5 J/g, and the same overall ethylene content within 10%.

The ethylene/α-olefin interpolymer can have one or any combination of the above characteristics.

In one embodiment, the ethylene/α-olefin interpolymer has (a) at least one molecular fraction which elutes between 0° C. and 130° C. when fractionated using TREF, characterized in that the fraction has a block index of at least 0.5 and up to about 1 and a molecular weight distribution, Mw/Mn, greater than about 1.3 or (b) an average block index greater than zero and up to about 1.0 and a molecular weight distribution, Mw/Mn, greater than about 1.3.

In one embodiment, the ethylene/α-olefin interpolymer is a random block copolymer comprising at least a hard block (or segment) and at least a soft block (or segment). Further, the random block copolymer can comprise multiple hard blocks and multiple soft blocks, and the hard blocks and soft blocks can be randomly distributed in a polymeric chain.

In one embodiment, the α-olefin used in the ethylene/α-olefin interpolymer is styrene, propylene, 1-butene, 1-hexene, 1-octene, 4-methyl-1-pentene, norbornene, 1-decene, 1,5-hexadiene, or a combination thereof.

In another embodiment, the ethylene/α-olefin interpolymer has a melt index in the range of about 0.1 to about 2000 g/10 minutes, about 2 to about 1500 g/10 minutes, about 2 to about 1000 g/10 minutes or about 2 to about 500 g/10 minutes measured according to ASTM D-1238, Condition 190° C./2.16 kg.

Additional aspects of the invention and characteristics and properties of various embodiments of the invention will become apparent with the following description.

DETAILED DESCRIPTION OF THE INVENTION

General Definitions

Figure 1:
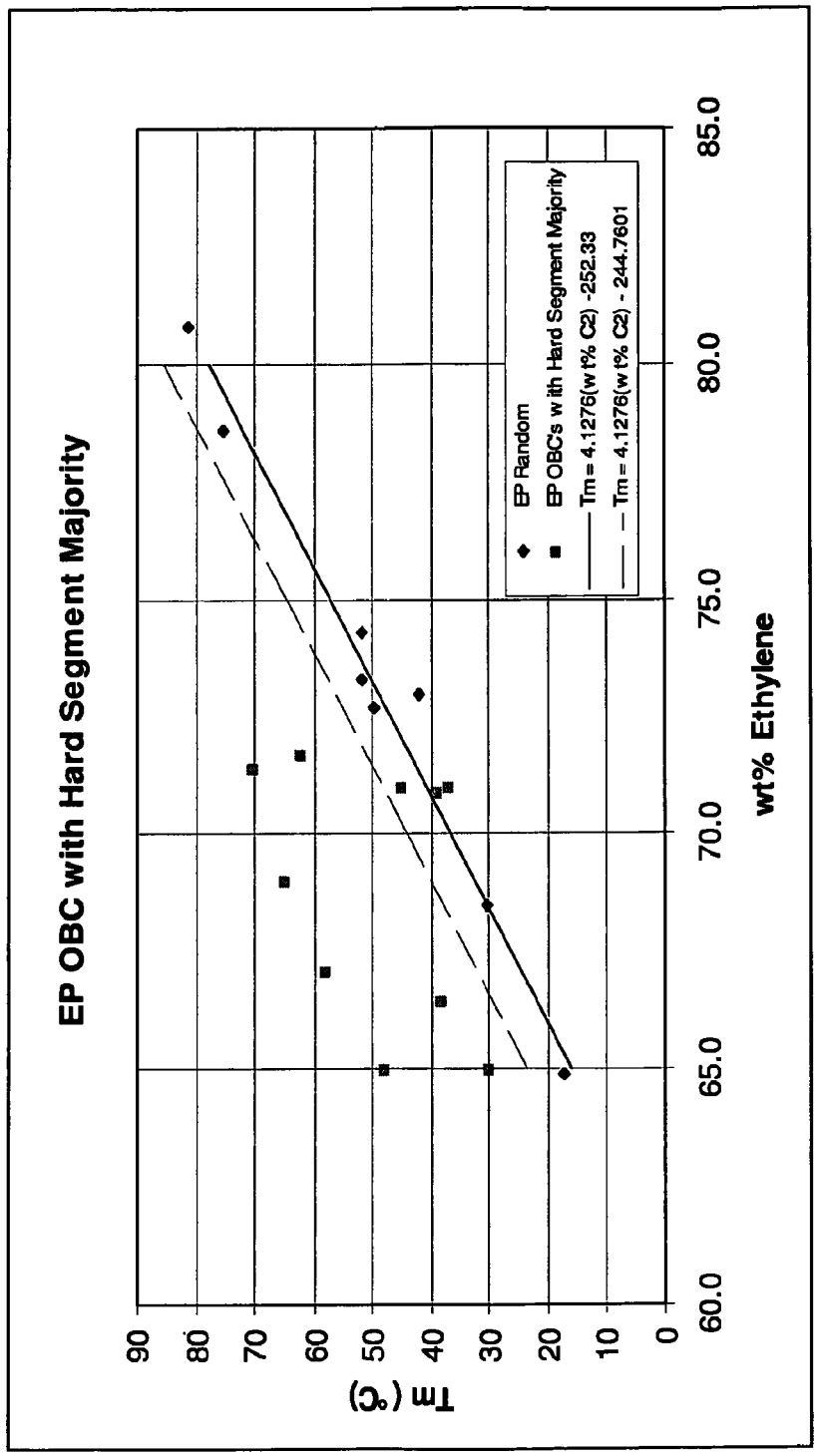
FIG. 1 shows a plot of $T_m$ vs wt %  for hard segment majority copolymers of the invention and for Comparative Examples.

"Polymer" means a polymeric compound prepared by polymerizing monomers, whether of the same or a different type. The generic term "polymer" embraces the terms "homopolymer," "copolymer," "terpolymer" as well as "interpolymer."

"Interpolymer" means a polymer prepared by the polymerization of at least two different types of monomers. The generic term "interpolymer" includes the term "copolymer" (which is usually employed to refer to a polymer prepared from two different monomers) as well as the term "terpolymer" (which is usually employed to refer to a polymer prepared from three different types of monomers). It also encompasses polymers made by polymerizing four or more types of monomers.

The term "ethylene/α-olefin interpolymer" generally refers to polymers comprising ethylene and an α-olefin having 3 or more carbon atoms. Preferably, ethylene comprises the majority mole fraction of the whole polymer, i.e., ethylene comprises at least about 50 mole percent of the whole polymer. More preferably ethylene comprises at least about 60 mole percent, at least about 70 mole percent, or at least about 80 mole percent, with the substantial remainder of the whole polymer comprising at least one other comonomer that is preferably an α-olefin having 3 or more carbon atoms. For many ethylene/propylene copolymers, the preferred composition comprises an ethylene content in the range of from about 55 wt % to about 75 wt %, preferably in the range of from about 60 wt % to about 73 wt %, based on the weight of the polymer. In some embodiments, the ethylene/α-olefin interpolymers do not include those produced in low yields or in a minor amount or as a by-product of a chemical process. While the ethylene/α-olefin interpolymers can be blended with one or more polymers, the as-produced ethylene/α-olefin interpolymers are substantially pure and often comprise a major component of the reaction product of a polymerization process.

The ethylene/α-olefin interpolymers comprise ethylene and one or more copolymerizable α-olefin comonomers in polymerized form, characterized by multiple blocks or segments of two or more polymerized monomer units differing in chemical or physical properties. That is, the ethylene/α-olefin interpolymers are block interpolymers, preferably multi-block interpolymers or copolymers. The terms "interpolymer" and "copolymer" are used interchangeably herein. In some embodiments, the multi-block copolymer can be represented by the following formula:

$(AB)_n$ where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, As and Bs are linked in a substantially linear fashion, as opposed to a substantially branched or substantially star-shaped fashion. In other embodiments, A blocks and B blocks are randomly distributed along the polymer chain. In other words, the block copolymers usually do not have a structure as follows.

In still other embodiments, the block copolymers do not usually have a third type of block, which comprises different comonomer(s). In yet other embodiments, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

The multi-block polymers typically comprise various amounts of "hard" and "soft" segments. "Hard" segments refer to blocks of polymerized units in which ethylene is present in an amount in the range of from about 60 wt % to about 95 wt %, and preferably in the range of from about 70 wt % to about 85 wt %, based on total monomer content in the hard segment. "Soft" segments, on the other hand, refer to blocks of polymerized units in which the comonomer content (content of monomers other than ethylene) is in the range of from about 30 wt % to about 80 wt %, preferably in the range of from about 35 wt % to about 80 wt %, based on the total monomer content in the soft segment.

The soft segments can often be present in a block interpolymer from about 1 weight percent to about 99 weight percent of the total weight of the block interpolymer, preferably from about 5 weight percent to about 95 weight percent, from about 10 weight percent to about 90 weight percent, from about 15 weight percent to about 85 weight percent, from about 20 weight percent to about 80 weight percent, from about 25 weight percent to about 75 weight percent, from about 30 weight percent to about 70 weight percent, from about 35 weight percent to about 65 weight percent, from about 40 weight percent to about 60 weight percent, or from about 45 weight percent to about 55 weight percent of the total weight of the block interpolymer. Conversely, the hard segments can be present in similar ranges. The polymer is said to have a hard segment majority when the amount of hard segment present is greater than 40% and a soft segment majority when the amount of soft segment is less than 60%. The soft segment weight percentage and the hard segment weight percentage can be calculated based on data obtained from DSC or NMR. Such methods and calculations are disclosed in U.S. patent application Ser. No. 11/376,835, US Patent Application Publication Number 2006-0199930, entitled "Ethylene/α-Olefin Block Interpolymers", filed on Mar. 15, 2006, in the name of Colin L. P. Shan, Lonnie Hazlitt, et. al. and assigned to Dow Global Technologies Inc., the disclosure of which is incorporated by reference herein in its entirety.

The term "crystalline" if employed, refers to a polymer that possesses a first order transition or crystalline melting point (Tm) as determined by differential scanning calorimetry (DSC) or equivalent technique. The term may be used interchangeably with the term "semicrystalline". The term "amorphous" refers to a polymer lacking a crystalline melting point as determined by differential scanning calorimetry (DSC) or equivalent technique.

The term "multi-block copolymer" or "segmented copolymer" refers to a polymer comprising two or more chemically distinct regions or segments (referred to as "blocks") preferably joined in a linear manner, that is, a polymer comprising chemically differentiated units which are joined end-to-end with respect to polymerized ethylenic functionality, rather than in pendent or grafted fashion. In a preferred embodiment, the blocks differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The multi-block copolymers are characterized by unique distributions of both polydispersity index (PDI or Mw/Mn), block length distribution, and/or block number distribution due to the unique process of making the copolymers. More specifically, when produced in a continuous process, the polymers desirably possess PDI from 1.7 to 2.9, preferably from 1.8 to 2.5, more preferably from 1.8 to 2.2, and most preferably from 1.8 to 2.1. When produced in a batch or semi-batch process, the polymers possess PDI from 1.0 to 2.9, preferably from 1.3 to 2.5, more preferably from 1.4 to 2.0, and most preferably from 1.4 to 1.8.

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, $R^L$ and an upper limit, $R^U$, is disclosed, any number falling within the range is specifically disclosed. In particular, the following numbers within the range are specifically disclosed: $R=R^L+k*(R^U-R^L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed.

Ethylene/α-olefin interpolymers containing low crystallinity hard blocks are polymers that have hard blocks that have melting points that are less than 100° C. These polymers differ from high melting point block copolymers in that their primary use is for compatibilization of polymer blend components and/or improving the solubility of polymers in solvents and oils. Applications include oil viscosity modifiers, thermoplastic olefin impact modifiers and compatibilizers, elastomer cross-linking and heat sealing polymers. Applications such as these require polymers with a low but broad range of temperatures for thermosetting and heat sealing operations.

Disclosed herein is an ethylene/α-olefin interpolymer comprising a hard segment and a soft segment, wherein the ethylene/α-olefin interpolymer:

(a) has a Mw/Mn from about 1.7 to about 3.5;

(b) has an ethylene content in the hard segment in the range of from 60 wt % to 95 wt % based on based on total monomer content in hard segment;

(c) (i) has a hard segment composition of at least 40%, at least one melting point, Tm, in degrees Celsius and an amount of ethylene in weight percent, wt % $C_2$, wherein the numerical values of Tm and wt % $C_2$ correspond to the relationship:

$$90° C. \geq Tm \geq 4.1276(\text{wt \% } C_2)-244.76; \text{ or}$$

(ii) has a hard segment composition of less than 40%, at least one melting point, Tm, in degrees Celsius and an amount of ethylene in weight percent, wt % $C_2$, wherein the numerical values of Tm and wt % $C_2$ correspond to the relationship:

$$80° C. \geq Tm \leq 4.1276(\text{wt \% } C_2)-264.95; \text{ or}$$

(iii) is characterized by an average block index greater than zero and up to about 1.0 and a molecular weight distribution, $M_w/M_n$, greater than about 1.3; or (iv) has a molecular fraction which elutes between 0° C. and 130° C. when fractionated using low temperature TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer; or (v) has a relationship between ethylene content in wt % and log molecular weight such that a line plotted of ethylene content vs log molecular weight as measured by GPC-IR has an absolute slope, m, of equal to or less than 4; and, (d) has a turbidity measurement of a 1.0 wt % solution of the ethylene/α-olefin interpolymer in oil or a 1.5 wt % solution in dodecane of less than or equal to that of a comparable copolymer wherein the comparable copolymer has the same DSC enthalpy (J/g) at greater than 55° C. within ±5 J/g, preferably ±2.5 J/g.

The ethylene/α-olefin interpolymer can have one or any combination of the above characteristics.

Ethylene/α-Olefin Interpolymers

The ethylene/α-olefin interpolymers used in embodiments of the invention (also referred to as "inventive interpolymer" or "inventive polymer") comprise ethylene and one or more copolymerizable α-olefin comonomers in polymerized form, characterized by multiple blocks or segments of two or more polymerized monomer units differing in chemical or physical properties (block interpolymer), preferably a multi-block copolymer.

In some embodiments, the multi-block copolymers possess a PDI fitting a Schultz-Flory distribution rather than a Poisson distribution. The copolymers are further characterized as having both a polydisperse block distribution and a polydisperse distribution of block sizes and possessing a most probable distribution of block lengths. Preferred multi-block copolymers are those containing 4 or more blocks or segments including terminal blocks. More preferably, the copolymers include at least 5, 10 or 20 blocks or segments including terminal blocks.

In one aspect, the ethylene/α-olefin interpolymers have a molecular fraction which elutes between 0° C. and 130° C.

when fractionated using Temperature Rising Elution Fractionation ("TREF"), characterized in that said fraction has a molar comonomer content higher, preferably at least 5 percent higher, more preferably at least 10 percent higher, than that of a comparable random ethylene interpolymer fraction eluting between the same temperatures, wherein the comparable random ethylene interpolymer contains the same comonomer(s), and has a melt index, density, and molar comonomer content (based on the whole polymer) within 10 percent of that of the block interpolymer. Preferably, the Mw/Mn of the comparable interpolymer is also within 10 percent of that of the block interpolymer and/or the comparable interpolymer has a total comonomer content within 10 weight percent of that of the block interpolymer.

Comonomer content may be measured using any suitable technique, with techniques based on nuclear magnetic resonance ("NMR") spectroscopy preferred. Moreover, for polymers or blends of polymers having relatively broad TREF curves, the polymer desirably is first fractionated using TREF into fractions each having an eluted temperature range of 10° C. or less. That is, each eluted fraction has a collection temperature window of 10° C. or less. Using this technique, said block interpolymers have at least one such fraction having a higher molar comonomer content than a corresponding fraction of the comparable interpolymer.

In another aspect, the inventive polymer is an olefin interpolymer, preferably comprising ethylene and one or more copolymerizable comonomers in polymerized form, characterized by multiple blocks (i.e., at least two blocks) or segments of two or more polymerized monomer units differing in chemical or physical properties (blocked interpolymer), most preferably a multi-block copolymer, said block interpolymer having a peak (but not just a molecular fraction) which elutes between 0° C. and 130° C. (but without collecting and/or isolating individual fractions), characterized in that said peak, has a comonomer content estimated by infra-red spectroscopy when expanded using a full width/half maximum (FWHM) area calculation, has an average molar comonomer content higher, preferably at least 5 percent higher, more preferably at least 10 percent higher, than that of a comparable random ethylene interpolymer peak at the same elution temperature and expanded using a full width/half maximum (FWHM) area calculation, wherein said comparable random ethylene interpolymer has the same comonomer(s) and has a melt index, density, and molar comonomer content (based on the whole polymer) within 10 percent of that of the blocked interpolymer. Preferably, the Mw/Mn of the comparable interpolymer is also within 10 percent of that of the blocked interpolymer and/or the comparable interpolymer has a total comonomer content within 10 weight percent of that of the blocked interpolymer. The full width/half maximum (FWHM) calculation is based on the ratio of methyl to methylene response area $[CH_3/CH_2]$ from the ATREF infra-red detector, wherein the tallest (highest) peak is identified from the base line, and then the FWHM area is determined. For a distribution measured using an ATREF peak, the FWHM area is defined as the area under the curve between $T_1$ and $T_2$, where $T_1$ and $T_2$ are points determined, to the left and right of the ATREF peak, by dividing the peak height by two, and then drawing a line horizontal to the base line, that intersects the left and right portions of the ATREF curve. A calibration curve for comonomer content is made using random ethylene/α-olefin copolymers, plotting comonomer content from NMR versus FWHM area ratio of the TREF peak. For this infra-red method, the calibration curve is generated for the same comonomer type of interest. The comonomer content of TREF peak of the inventive polymer can be determined by referencing this calibration curve using its FWHM methyl:methylene area ratio $[CH_3/CH_2]$ of the TREF peak.

In addition to the above aspects and properties described herein, the inventive polymers can be characterized by one or more additional characteristics. In one aspect, the inventive polymer is an olefin interpolymer, preferably comprising ethylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 0° C. and 130° C., when fractionated using TREF increments, characterized in that said fraction has a molar comonomer content higher, preferably at least 5 percent higher, more preferably at least 10, 15, 20 or 25 percent higher, than that of a comparable random ethylene interpolymer fraction eluting between the same temperatures, wherein said comparable random ethylene interpolymer comprises the same comonomer(s), preferably it is the same comonomer(s), and a melt index, density, and molar comonomer content (based on the whole polymer) within 10 percent of that of the blocked interpolymer. Preferably, the Mw/Mn of the comparable interpolymer is also within 10 percent of that of the blocked interpolymer and/or the comparable interpolymer has a total comonomer content within 10 weight percent of that of the blocked interpolymer.

In some embodiments, the ethylene/α-olefin interpolymers additionally have a Tm in the range of from −25° C. to 100° C., preferably from 30° C. to 80° C., and more preferably from 35° C. to 75° C. In some embodiments, they may also have a Tm in the range of from 15° C. to 50° C., from 30° C. to 45° C. or from 35° C. to 40° C. In some embodiments, the interpolymers have a Tm that is less than that of a comparable random copolymer with same weight percent comonomer within 10%. In addition, in some embodiments the end of melting occurs at less than 100° C., preferably in the range of from 85° C. to 95° C.

In one aspect of the invention, the ethylene/α-olefin interpolymers have a hard segment majority and have a melting temperature that is greater than that of a corresponding random copolymer. In another aspect, the ethylene/α-olefin interpolymers have a soft segment majority and have a melting temperature that is less than that of a corresponding random copolymer.

In another aspect of the invention, the ethylene/α-olefin interpolymers have a turbidity in a 1.0 wt % solution of the ethylene/α-olefin interpolymer in oil or a 1.5 wt % solution in dodecane as compared to that of a random or a blend of polymers having the same integrated DSC enthalpy (J/g) above about 55° C. within 5 J/g, that is less than or equal to the comparative polymers within ±10%. In some aspects, the interpolymers of the invention have such a turbidity that is less than 1.5 NTU and a DSC enthalpy at greater than 55° C. of less than 2 J/g.

The ethylene/α-olefin interpolymers have a relationship between ethylene and log molecular weight such that a line plotted of ethylene content vs log molecular weight as measured by GPC-IR has an absolute slope, m, of equal to or less than 4. The interpolymers of the present invention also have an absolute slope, m, that is less than that for a blend of polymers with the same total weight percent ethylene, within ±20% preferably within ±10%, and more preferably within ±5%.

In one embodiment of the invention, the ethylene/α-olefin interpolymers have an integrated DSC Enthalpy (J/g) above 30° C. that is greater than 7.5 J/g, have an MWD >1.7, a molecular fraction which elutes between 10° C. and 130° C., when fractionated using TREF increments, characterized in that said fraction has a molar comonomer content higher, preferably at least 5 percent higher, more preferably at least 10, 15, 20 or 25 percent higher, than that of a comparable random ethylene interpolymer fraction eluting between the same temperatures, wherein said comparable random ethylene interpolymer comprises the same comonomer(s), preferably it is the same comonomer(s), and a melt index, density, and molar comonomer content (based on the whole polymer) within 10 percent of that of the blocked interpolymer; and, a room temperature turbidity of a 1 wt % solution of inventive polymer in oil (Exxon FN1365 100LP Base Oil) of less than 10 NTU, preferably less than 5 NTU, most preferably less than 3 NTU.

ATREF Peak Comonomer Composition Measurement by Infra-Red Detector

The comonomer composition of the TREF peak can be measured using an IR4 infra-red detector available from Polymer Char, Valencia, Spain (http://www.polymerchar.com/).

The "composition mode" of the detector is equipped with a measurement sensor ($CH_2$) and composition sensor ($CH_3$) that are fixed narrow band infra-red filters in the region of 2800-3000 cm$^{-1}$. The measurement sensor detects the methylene ($CH_2$) carbons on the polymer (which directly relates to the polymer concentration in solution) while the composition sensor detects the methyl ($CH_3$) groups of the polymer. The mathematical ratio of the composition signal ($CH_3$) divided by the measurement signal ($CH_2$) is sensitive to the comonomer content of the measured polymer in solution and its response is calibrated with known ethylene alpha-olefin copolymer standards.

The detector when used with an ATREF instrument provides both a concentration ($CH_2$) and composition ($CH_3$) signal response of the eluted polymer during the TREF process. A polymer specific calibration can be created by measuring the area ratio of the $CH_3$ to $CH_2$ for polymers with known comonomer content (preferably measured by NMR). The comonomer content of an ATREF peak of a polymer can be estimated by applying the reference calibration of the ratio of the areas for the individual $CH_3$ and $CH_2$ response (i.e. area ratio $CH_3/CH_2$ versus comonomer content).

The area of the peaks can be calculated using a full width/half maximum (FWHM) calculation after applying the appropriate baselines to integrate the individual signal responses from the TREF chromatogram. The full width/half maximum calculation is based on the ratio of methyl to methylene response area [$CH_3/CH_2$] from the ATREF infra-red detector, wherein the tallest (highest) peak is identified from the base line, and then the FWHM area is determined. For a distribution measured using an ATREF peak, the FWHM area is defined as the area under the curve between T1 and T2, where T1 and T2 are points determined, to the left and right of the ATREF peak, by dividing the peak height by two, and then drawing a line horizontal to the base line, that intersects the left and right portions of the ATREF curve.

The application of infra-red spectroscopy to measure the comonomer content of polymers in this ATREF-infra-red method is, in principle, similar to that of GPC/FTIR systems as described in the following references: Markovich, Ronald P.; Hazlitt, Lonnie G.; Smith, Linley; "Development of gel-permeation chromatography-Fourier transform infrared spectroscopy for characterization of ethylene-based polyolefin copolymers". Polymeric Materials Science and Engineering (1991), 65, 98-100.; and Deslauriers, P. J.; Rohlfing, D. C.; Shieh, E. T.; "Quantifying short chain branching microstructures in ethylene-1-olefin copolymers using size exclusion chromatography and Fourier transform infrared spectroscopy (SEC-FTIR)", Polymer (2002), 43, 59-170, both of which are incorporated by reference herein in their entirety.

In other embodiments, the inventive ethylene/α-olefin interpolymer is characterized by an average block index, ABI, which is greater than zero and up to about 1.0 and a molecular weight distribution, $M_w/M_n$, greater than about 1.3. The average block index, ABI, is the weight average of the block index ("BI") for each of the polymer fractions obtained in preparative TREF from 20° C. and 110° C., with an increment of 5° C.:

$$ABI=\Sigma(w_i BI_i)$$

where $BI_i$ is the block index for the i$^{th}$ fraction of the inventive ethylene/α-olefin interpolymer obtained in preparative TREF, and $w_i$ is the weight percentage of the i$^{th}$ fraction.

For each polymer fraction, BI is defined by one of the two following equations (both of which give the same BI value):

$$BI = \frac{1/T_X - 1/T_{XO}}{1/T_A - 1/T_{AB}} \text{ or } BI = -\frac{LnP_X - LnP_{XO}}{LnP_A - LnP_{AB}}$$

where $T_X$ is the preparative ATREF elution temperature for the i$^{th}$ fraction (preferably expressed in Kelvin), $P_X$ is the ethylene mole fraction for the i$^{th}$ fraction, which can be measured by NMR or IR as described above. $P_{AB}$ is the ethylene mole fraction of the whole ethylene/α-olefin interpolymer (before fractionation), which also can be measured by NMR or IR. $T_A$ and $P_A$ are the ATREF elution temperature and the ethylene mole fraction for pure "hard segments" (which refer to the crystalline segments of the interpolymer). As a first order approximation, the $T_A$ and $P_A$ values are set to those for high density polyethylene homopolymer, if the actual values for the "hard segments" are not available. For calculations performed herein, $T_A$ is 372° K., $P_A$ is 1.

$T_{AB}$ is the ATREF temperature for a random copolymer of the same composition and having an ethylene mole fraction of $P_{AB}$. $T_{AB}$ can be calculated from the following equation:

$$LnP_{AB}=\alpha/T_{AB}+\beta$$

where α and β are two constants which can be determined by calibration using a number of known random ethylene copolymers. It should be noted that α and β may vary from instrument to instrument. Moreover, one would need to create their own calibration curve with the polymer composition of interest and also in a similar molecular weight range as the fractions. There is a slight molecular weight effect. If the calibration curve is obtained from similar molecular weight ranges, such effect would be essentially negligible. In some embodiments, random ethylene copolymers satisfy the following relationship:

$$LnP=-237.83/T_{ATREF}+0.639$$

$T_{XO}$ is the ATREF temperature for a random copolymer of the same composition and having an ethylene mole fraction of $P_X$. $T_{XO}$ can be calculated from $LnP_X=\alpha/T_{XO}+\beta$. Conversely, $P_{XO}$ is the ethylene mole fraction for a random copolymer of the same composition and having an ATREF temperature of $T_X$, which can be calculated from $Ln P_{XO}=\alpha/T_X+\beta$.

Once the block index (BI) for each preparative TREF fraction is obtained, the weight average block index, ABI, for the whole polymer can be calculated. In some embodiments, ABI is greater than zero but less than about 0.3 or from about 0.1 to about 0.3. In other embodiments, ABI is greater than about 0.3 and up to about 1.0. Preferably, ABI should be in the range of from about 0.4 to about 0.7, from about 0.5 to about 0.7, or from about 0.6 to about 0.9. In some embodiments, ABI is in the range of from about 0.3 to about 0.9, from about 0.3 to about 0.8, or from about 0.3 to about 0.7, from about 0.3 to about 0.6, from about 0.3 to about 0.5, or from about 0.3 to about 0.4. In other embodiments, ABI is in the range of from about 0.4 to about 1.0, from about 0.5 to about 1.0, or from about 0.6 to about 1.0, from about 0.7 to about 1.0, from about 0.8 to about 1.0, or from about 0.9 to about 1.0.

Another characteristic of the inventive ethylene/α-olefin interpolymer is that the inventive ethylene/α-olefin interpolymer comprises at least one polymer fraction which can be obtained by preparative TREF, wherein the fraction has a block index greater than about 0.1 and up to about 1.0 and a molecular weight distribution, $M_w/M_n$, greater than about 1.3. In some embodiments, the polymer fraction has a block index greater than about 0.6 and up to about 1.0, greater than about 0.7 and up to about 1.0, greater than about 0.8 and up to about 1.0, or greater than about 0.9 and up to about 1.0. In other embodiments, the polymer fraction has a block index greater than about 0.1 and up to about 1.0, greater than about 0.2 and up to about 1.0, greater than about 0.3 and up to about 1.0, greater than about 0.4 and up to about 1.0, or greater than about 0.4 and up to about 1.0. In still other embodiments, the polymer fraction has a block index greater than about 0.1 and up to about 0.5, greater than about 0.2 and up to about 0.5, greater than about 0.3 and up to about 0.5, or greater than about 0.4 and up to about 0.5. In yet other embodiments, the polymer fraction has a block index greater than about 0.2 and up to about 0.9, greater than about 0.3 and up to about 0.8, greater than about 0.4 and up to about 0.7, or greater than about 0.5 and up to about 0.6.

For copolymers of ethylene and an α-olefin, the inventive polymers preferably possess (1) a PDI of at least 1.3, more preferably at least 1.5, at least 1.7, or at least 2.0, and most preferably at least 2.6, up to a maximum value of 5.0, more preferably up to a maximum of 3.5, and especially up to a maximum of 2.7; (2) a heat of fusion of 80 J/g or less; (3) an ethylene content of at least 50 weight percent; (4) a glass transition temperature, $T_g$, of less than −25° C., more preferably less than −30° C., and/or (5) one and only one $T_m$.

Additionally, the ethylene/α-olefin interpolymers can have a melt index, $I_2$, from 0.01 to 2000 g/10 minutes, preferably from 0.01 to 1000 g/10 minutes, more preferably from 0.01 to 500 g/10 minutes, and especially from 0.01 to 100 g/10 minutes. In certain embodiments, the ethylene/α-olefin interpolymers have a melt index, $I_2$, from 0.01 to 10 g/10 minutes, from 0.5 to 50 g/10 minutes, from 1 to 30 g/10 minutes, from 1 to 6 g/10 minutes or from 0.3 to 10 g/10 minutes. In certain embodiments, the melt index for the ethylene/α-olefin polymers is 1 g/10 minutes, 3 g/10 minutes or 5 g/10 minutes.

The polymers can have molecular weights, $M_w$, from 1,000 g/mole to 5,000,000 g/mole, preferably from 1000 g/mole to 1,000,000, more preferably from 10,000 g/mole to 500,000 g/mole, and especially from 10,000 g/mole to 300,000 g/mole. The density of the inventive polymers can be from 0.80 to 0.99 g/cm³ and preferably for ethylene containing polymers from 0.85 g/cm³ to 0.97 g/cm³. In certain embodiments, the density of the ethylene/α-olefin polymers ranges from 0.860 to 0.925 g/cm³ or 0.867 to 0.910 g/cm³.

Processes useful for making the polymers have been disclosed in the following patent applications: U.S. Provisional Application No. 60/553,906, filed Mar. 17, 2004; U.S. Provisional Application No. 60/662,937, filed Mar. 17, 2005; U.S. Provisional Application No. 60/662,939, filed Mar. 17, 2005; U.S. Provisional Application No. 60/566,2938, filed Mar. 17, 2005; PCT Application No. PCT/US2005/008916, filed Mar. 17, 2005, publication number WO 2005/090425, published Sep. 29, 2005; PCT Application No. PCT/US2005/008915, filed Mar. 17, 2005, publication number WO 2005/090426, published Sep. 29, 2005; and PCT Application No. PCT/US2005/008917, filed Mar. 17, 2005, publication number WO 2005/090427, published Sep. 29, 2005 all of which are incorporated by reference herein in their entirety. For example, one such method comprises contacting ethylene and optionally one or more addition polymerizable monomers other than ethylene under addition polymerization conditions with a catalyst composition comprising:

the admixture or reaction product resulting from combining:

(A) a first olefin polymerization catalyst having a high comonomer incorporation index, (B) a second olefin polymerization catalyst having a comonomer incorporation index less than 90 percent, preferably less than 50 percent, most preferably less than 5 percent of the comonomer incorporation index of catalyst (A), and (C) a chain shuttling agent.

Representative catalysts and chain shuttling agent are as follows. Chemical structures follow each description.

Catalyst (A1) is [N-(2,6-di(1-methylethyl)phenyl)amido) (2-isopropylphenyl)(α-naphthalen-2-diyl(6-pyridin-2-diyl) methane)]hafnium dimethyl, prepared according to the teachings of WO 03/40195, 2003US0204017, U.S. Ser. No. 10/429,024, filed May 2, 2003, and WO 04/24740, all of which are herein incorporated by reference.

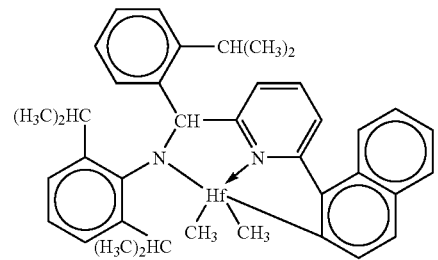

Catalyst (A2) is [N-(2,6-di(1-methylethyl)phenyl)amido) (2-methylphenyl)(1,2-phenylene-(6-pyridin-2-diyl)methane)]hafnium dimethyl, prepared according to the teachings of WO 03/40195, 2003US0204017, U.S. Ser. No. 10/429, 024, filed May 2, 2003, and WO 04/24740, all of which are herein incorporated by reference.

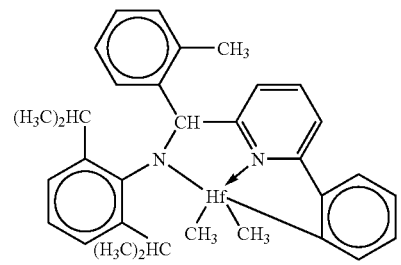

Catalyst (A3) is bis[N,N'''-(2,4,6 tri(methylphenyl)amido) ethylenediamine]hafnium dibenzyl.

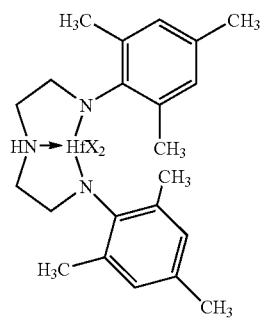

X = CH₂C₆H₅

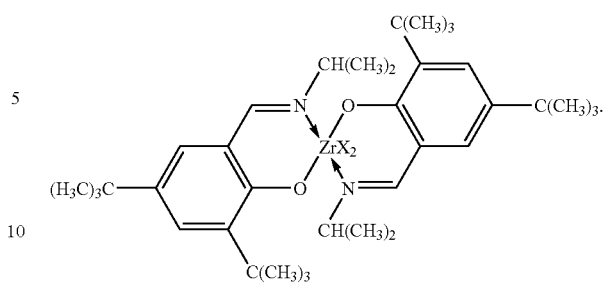

X = CH₂C₆H₅

Catalyst (A4) is bis((2-oxoyl-3-(dibenzo-1H-pyrrole-1-yl)-5-(methyl)phenyl)-2-phenoxymethyl)cyclohexane-1,2-diyl zirconium (IV) dibenzyl, prepared substantially according to the teachings of US-A-2004/0010103, which is herein incorporated by reference.

Catalyst (B2) is 1,2-bis-(3,5-di-t-butylphenylene)(1-(N-(2-methylcyclohexyl)-immino)methyl)(2-oxoyl) zirconium dibenzyl

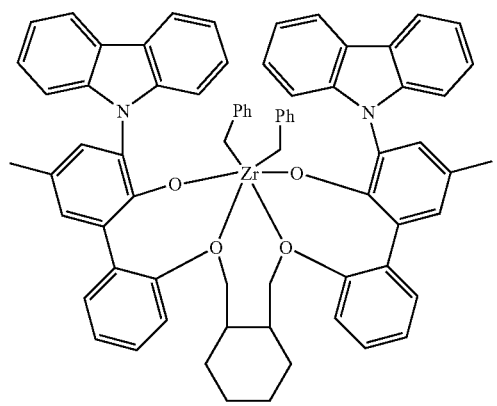

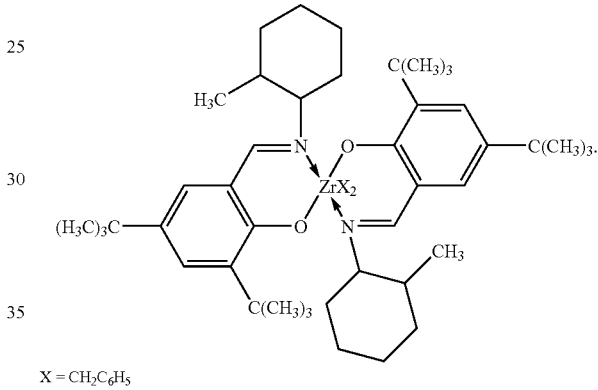

X = CH₂C₆H₅

Catalyst (A5) is [η²-2,6-diisopropyl-N-(2-methyl-3-(octylimino)butan-2-yl)benzenamide]trimethylhafnium, prepared substantially according to the teachings of WO2003/051935, which is herein incorporated by reference.

Catalyst (C1) is (t-butylamido)dimethyl(3-N-pyrrolyl-1,2,3,3a,7a-η-inden-1-yl)silanetitanium dimethyl prepared substantially according to the techniques of U.S. Pat. No. 6,268,444, which is herein incorporated by reference:

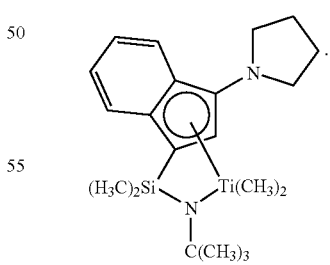

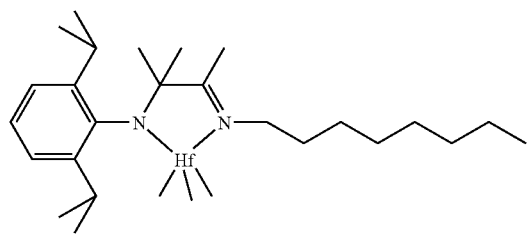

Catalyst (B1) is 1,2-bis-(3,5-di-t-butylphenylene)(1-(N-(1-methylethyl)imino)methyl)(2-oxoyl) zirconium dibenzyl Catalyst (C2) is (t-butylamido)di(4-methylphenyl)(2-methyl-1,2,3,3a,7a-η-inden-1-yl)silanetitanium dimethyl prepared substantially according to the teachings of US-A-2003/004286, which is herein incorporated by reference:

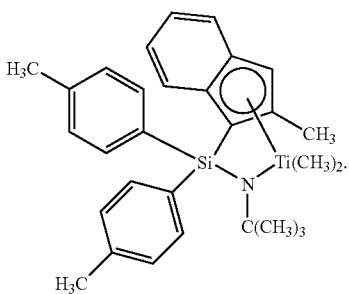

Catalyst (C3) is (t-butylamido)di(4-methylphenyl)(2-methyl-1,2,3,3a,8a-η-s-indacen-1-yl)silanetitanium dimethyl prepared substantially according to the teachings of US-A-2003/004286, which is herein incorporated by reference:

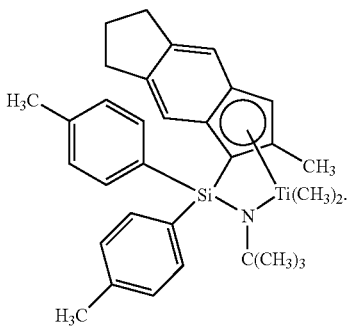

Catalyst (D1) is bis(dimethyldisiloxane)(indene-1-yl)zirconium dichloride available from Sigma-Aldrich:

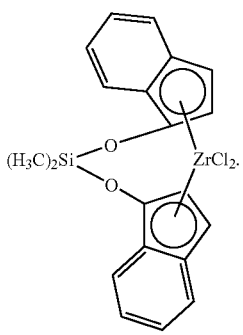

Shuttling Agents The shuttling agents employed include diethylzinc, di(i-butyl)zinc, di(n-hexyl)zinc, triethylaluminum, trioctylaluminum, triethylgallium, i-butylaluminum bis(dimethyl(t-butyl)siloxane), i-butylaluminum bis(di(trimethylsilyl)amide), n-octylaluminum di(pyridine-2-methoxide), bis(n-octadecyl)i-butylaluminum, i-butylaluminum bis(di(n-pentyl)amide), n-octylaluminum bis(2,6-di-t-butylphenoxide), n-octylaluminum di(ethyl(1-naphthyl)amide), ethylaluminum bis(t-butyldimethylsiloxide), ethylaluminum di(bis(trimethylsilyl)amide), ethylaluminum bis(2,3,6,7-dibenzo-1-azacycloheptaneamide), n-octylaluminum bis(2,3,6,7-dibenzo-1-azacycloheptaneamide), n-octylaluminum bis(dimethyl(t-butyl)siloxide, ethylzinc(2,6-diphenylphenoxide), and ethylzinc (t-butoxide).

Preferably, the foregoing process takes the form of a continuous solution process for forming block copolymers, especially multi-block copolymers, preferably linear multi-block copolymers of two or more monomers, more especially ethylene and a $C_{3-20}$ olefin or cycloolefin, and most especially ethylene and a $C_{4-20}$ α-olefin, using multiple catalysts that are incapable of interconversion. That is, the catalysts are chemically distinct. Under continuous solution polymerization conditions, the process is ideally suited for polymerization of mixtures of monomers at high monomer conversions. Under these polymerization conditions, shuttling from the chain shuttling agent to the catalyst becomes advantaged compared to chain growth, and multi-block copolymers, especially linear multi-block copolymers are formed in high efficiency. Chain terminating agents such as hydrogen may be used if desired to control reactor viscosity or polymer molecular weight.

The inventive interpolymers may comprise alternating blocks of differing comonomer content (including homopolymer blocks). The inventive interpolymers may also comprise a distribution in number and/or block size of polymer blocks of differing density or comonomer content, which is a Schultz-Flory type of distribution.

Moreover, the inventive multiblock interpolymers may be prepared using techniques to influence the degree or level of blockiness. That is the amount of comonomer and length of each polymer block or segment can be altered by controlling the ratio and type of catalysts and shuttling agent as well as the temperature of the polymerization, and other polymerization variables. A surprising benefit of this phenomenon is the discovery that as the degree of blockiness is increased, the optical properties, solubility of the polymer in solvents and oils, and compatibility between dissimilar polymers are improved. In particular, haze decreases while clarity, increase as the average number of blocks in the polymer increases. By selecting shuttling agents and catalyst combinations having the desired chain transferring ability (high rates of shuttling with low levels of chain termination) other forms of polymer termination are effectively suppressed. Accordingly, little if any β-hydride elimination is observed in the polymerization of ethylene/α-olefin comonomer mixtures according to embodiments of the invention, and the resulting crystalline blocks are highly, or substantially completely, linear, possessing little or no long chain branching.

Polymers with highly crystalline chain ends can be selectively prepared in accordance with embodiments of the invention. In elastomer applications, reducing the relative quantity of polymer that terminates with an amorphous block reduces the intermolecular dilutive effect on crystalline regions. This result can be obtained by choosing chain shuttling agents and catalysts having an appropriate response to hydrogen or other chain terminating agents. Specifically, if the catalyst which produces highly crystalline polymer is more susceptible to chain termination (such as by use of hydrogen) than the catalyst responsible for producing the less crystalline polymer segment (such as through higher comonomer incorporation, regio-error, or atactic polymer formation), then the highly crystalline polymer segments will preferentially populate the terminal portions of the polymer. Not only are the resulting terminated groups crystalline, but upon termination, the highly crystalline polymer forming catalyst site is once again available for reinitiation of polymer formation. The initially formed polymer is therefore another highly crystalline polymer segment. Accordingly, both ends of the resulting multi-block copolymer are preferentially highly crystalline.

The ethylene/α-olefin interpolymers used in the embodiments of the invention are preferably interpolymers of ethylene with at least one $C_3$-$C_{20}$ α-olefin. Copolymers of ethylene and a $C_3$-$C_{20}$ α-olefin are especially preferred. The interpolymers may further comprise $C_4$-$C_{18}$ diolefin and/or alkenylbenzene. Suitable unsaturated comonomers useful for polymerizing with ethylene include, for example, ethylenically unsaturated monomers, conjugated or nonconjugated dienes, polyenes, alkenylbenzenes, etc. Examples of such comonomers include $C_3$-$C_{20}$ α-olefins such as propylene, isobutylene, 1-butene, 1-hexene, 1-pentene, 4-methyl-1-pentene, 1-heptene, 1-octene, 1-nonene, 1-decene, and the like. Propylene and non-conjugated dienes are preferred. Other suitable monomers include styrene, halo- or alkyl-substituted styrenes, vinylbenzocyclobutane, 1,4-hexadiene, 1,7-octadiene, and naphthenics (e.g., cyclopentene, cyclohexene and cyclooctene).

While ethylene/α-olefin interpolymers are preferred polymers, other ethylene/olefin polymers may also be used. Olefins as used herein refer to a family of unsaturated hydrocarbon-based compounds with at least one carbon-carbon double bond. Depending on the selection of catalysts, any olefin may be used in embodiments of the invention. Preferably, suitable olefins are $C_3$-$C_{20}$ aliphatic and aromatic compounds containing vinylic unsaturation, as well as cyclic compounds, such as cyclobutene, cyclopentene, dicyclopentadiene, and norbornene, including but not limited to, norbornene substituted in the 5 and 6 position with $C_1$-$C_{20}$ hydrocarbyl or cyclohydrocarbyl groups. Also included are mixtures of such olefins as well as mixtures of such olefins with $C_4$-$C_{40}$ diolefin compounds.

Examples of olefin monomers include, but are not limited to propylene, isobutylene, 1-butene, 1-pentene, 1-hexene, 1-heptene, 1-octene, 1-nonene, 1-decene, and 1-dodecene, 1-tetradecene, 1-hexadecene, 1-octadecene, 1-eicosene, 3-methyl-1-butene, 3-methyl-1-pentene, 4-methyl-1-pentene, 4,6-dimethyl-1-heptene, 4-vinylcyclohexene, vinylcyclohexane, norbornadiene, ethylidene norbornene, cyclopentene, cyclohexene, dicyclopentadiene, cyclooctene, $C_4$-$C_{40}$ dienes, including but not limited to 1,3-butadiene, 1,3-pentadiene, 1,4-hexadiene, 1,5-hexadiene, 1,7-octadiene, 1,9-decadiene, other $C_4$-$C_{40}$ α-olefins, and the like. In certain embodiments, the α-olefin is propylene, 1-butene, 1-pentene, 1-hexene, 1-octene or a combination thereof. Although any hydrocarbon containing a vinyl group potentially may be used in embodiments of the invention, practical issues such as monomer availability, cost, and the ability to conveniently remove unreacted monomer from the resulting polymer may become more problematic as the molecular weight of the monomer becomes too high.

The polymerization processes described herein are well suited for the production of olefin polymers comprising monovinylidene aromatic monomers including styrene, o-methyl styrene, p-methyl styrene, t-butylstyrene, and the like. In particular, interpolymers comprising ethylene and styrene can be prepared by following the teachings herein. Optionally, copolymers comprising ethylene, styrene and a $C_3$-$C_{20}$ alpha olefin, optionally comprising a $C_4$-$C_{20}$ diene, having improved properties can be prepared.

Suitable non-conjugated diene monomers can be a straight chain, branched chain or cyclic hydrocarbon diene having from 6 to 15 carbon atoms. Examples of suitable non-conjugated dienes include, but are not limited to, straight chain acyclic dienes, such as 1,4-hexadiene, 1,6-octadiene, 1,7-octadiene, 1,9-decadiene, branched chain acyclic dienes, such as 5-methyl-1,4-hexadiene; 3,7-dimethyl-1,6-octadiene; 3,7-dimethyl-1,7-octadiene and mixed isomers of dihydromyricene and dihydroocinene, single ring alicyclic dienes, such as 1,3-cyclopentadiene; 1,4-cyclohexadiene; 1,5-cyclooctadiene and 1,5-cyclododecadiene, and multi-ring alicyclic fused and bridged ring dienes, such as tetrahydroindene, methyl tetrahydroindene, dicyclopentadiene, bicyclo-(2,2,1)-hepta-2,5-diene; alkenyl, alkylidene, cycloalkenyl and cycloalkylidene norbornenes, such as 5-methylene-2-norbornene (MNB); 5-propenyl-2-norbornene, 5-isopropylidene-2-norbornene, 5-(4-cyclopentenyl)-2-norbornene, 5-cyclohexylidene-2-norbornene, 5-vinyl-2-norbornene, and norbornadiene. Of the dienes typically used to prepare EPDMs, the particularly preferred dienes are 1,4-hexadiene (HD), 5-ethylidene-2-norbornene (ENB), 5-vinylidene-2-norbornene (VNB), 5-methylene-2-norbornene (MNB), and dicyclopentadiene (DCPD). The especially preferred dienes are 5-ethylidene-2-norbornene (ENB) and 1,4-hexadiene (HD).

One class of desirable polymers that can be made in accordance with embodiments of the invention are elastomeric interpolymers of ethylene, a $C_3$-$C_{20}$ α-olefin, especially propylene, and optionally one or more diene monomers. Preferred α-olefins for use in this embodiment of the present invention are designated by the formula $CH_2$=$CHR^*$, where $R^*$ is a linear or branched alkyl group of from 1 to 12 carbon atoms. Examples of suitable α-olefins include, but are not limited to, propylene, isobutylene, 1-butene, 1-pentene, 1-hexene, 4-methyl-1-pentene, and 1-octene. A particularly preferred α-olefin is propylene. The propylene based polymers are generally referred to in the art as EP or EPDM polymers. Suitable dienes for use in preparing such polymers, especially multi-block EPDM type polymers include conjugated or non-conjugated, straight or branched chain-, cyclic- or polycyclic-dienes comprising from 4 to 20 carbons. Preferred dienes include 1,4-pentadiene, 1,4-hexadiene, 5-ethylidene-2-norbornene, dicyclopentadiene, cyclohexadiene, and 5-butylidene-2-norbornene. A particularly preferred diene is 5-ethylidene-2-norbornene.

Because the diene containing polymers comprise alternating segments or blocks containing greater or lesser quantities of the diene (including none) and α-olefin (including none), the total quantity of diene and α-olefin may be reduced without loss of subsequent polymer properties. That is, because the diene and α-olefin monomers are preferentially incorporated into one type of block of the polymer rather than uniformly or randomly throughout the polymer, they are more efficiently utilized and subsequently the crosslink density of the polymer can be better controlled. Such crosslinkable elastomers and the cured products have advantaged properties, including higher tensile strength and better elastic recovery.

In some embodiments, the inventive interpolymers made with two catalysts incorporating differing quantities of comonomer have a weight ratio of blocks formed thereby from 95:5 to 5:95. The elastomeric polymers desirably have an ethylene content of from 20 to 90 percent, a diene content of from 0.1 to 10 percent, and an α-olefin content of from 10 to 80 percent, based on the total weight of the polymer. Further preferably, the multi-block elastomeric polymers have an ethylene content of from 60 to 90 percent, a diene content of from 0.1 to 10 percent, and an α-olefin content of from 10 to 40 percent, based on the total weight of the polymer. Preferred polymers are high molecular weight polymers, having a weight average molecular weight (Mw) from 10,000 to about 2,500,000, preferably from 20,000 to 500,000, more preferably from 20,000 to 350,000, and a polydispersity less than 3.5, more preferably less than 3.0, and a Mooney viscosity (ML (1+4) 125° C.) from 1 to 250. More preferably, such polymers have an ethylene content from 65 to 75 percent, a diene content from 0 to 6 percent, and an α-olefin content from 20 to 35 percent.

The ethylene/α-olefin interpolymers can be functionalized by incorporating at least one functional group in its polymer structure. Exemplary functional groups may include, for example, ethylenically unsaturated mono- and di-functional carboxylic acids, ethylenically unsaturated mono- and di-functional carboxylic acid anhydrides, salts thereof and esters thereof. Such functional groups may be grafted to an ethylene/α-olefin interpolymer, or it may be copolymerized with ethylene and an optional additional comonomer to form an interpolymer of ethylene, the functional comonomer and optionally other comonomer(s). Means for grafting functional groups onto polyethylene are described for example in U.S. Pat. Nos. 4,762,890, 4,927,888, and 4,950,541, the disclosures of these patents are incorporated herein by reference in their entirety. One particularly useful functional group is malic anhydride.

The amount of the functional group present in the functional interpolymer can vary. The functional group can typically be present in a copolymer-type functionalized interpolymer in an amount of at least about 1.0 weight percent, preferably at least about 5 weight percent, and more preferably at least about 7 weight percent. The functional group will typically be present in a copolymer-type functionalized interpolymer in an amount less than about 40 weight percent, preferably less than about 30 weight percent, and more preferably less than about 25 weight percent.

The ethylene/α-olefin interpolymers of the present invention may be used in a number of applications, a non-limiting set of examples of which are given below. The interpolymers may be used an impact modifier for polypropylene; a compatibilizer for random ethylene/alpha olefin copolymers or termonomers and polypropylene; and, the interpolymers may be used as a peroxide crosslinked elastomer with either ethylene/alpha olefin copolymers or ethylene/alpha olefin/non-conjugated diene termonomers. Additionally, the lower melting point allows for manufacture in standard thermoset applications. Such applications include, but are not limited to: conveyor belting; V-belting; crosslinked foams, including, but not limited to, midsole foams in footwear, foamed mats, wet suits, extruded sponge profiles, dual hardness sponge/solid coextruded profiles, single ply roofing, and windshield wipers.

For an ethylene/alpha olefin/nonconjugated diene termonomer composition, sulfur or phenolic cured versions of elastomeric compositions may be produced. Similar applications may be used as described for peroxide crosslinked elastomers.

The compositions of the present invention may also be used in oil extended gel compounds in thermoplastic or thermoset applications. In addition, the ethylene/α-olefin interpolymers of the present invention may be used in noise, vibration and harshness (NVH) control related applications.

The ethylene/α-olefin interpolymers may also comprise additives and adjuvants. Suitable additives include, but are not limited to, fillers, such as organic or inorganic particles, including clays, talc, titanium dioxide, zeolites, powdered metals, organic or inorganic fibers, nano-sized particles, clays, and so forth; tackifiers, oil extenders, including paraffinic or napthelenic oils; and other natural and synthetic polymers, including other polymers according to embodiments of the invention. Additionally, minor amounts of a different polymer may be used as a carrier for any of the additives. An example of such a polymer would be polyethylene, for example AFFINITY® resins (The Dow Chemical Company) or EXACT® resins (ExxonMobil Chemical Company.

The following examples are presented to exemplify embodiments of the invention but are not intended to limit the invention to the specific embodiments set forth. Unless indicated to the contrary, all parts and percentages are by weight. All numerical values are approximate. When numerical ranges are given, it should be understood that embodiments outside the stated ranges may still fall within the scope of the invention. Specific details described in each example should not be construed as necessary features of the invention.

EXAMPLES

Testing Methods

In the examples that follow, the following analytical techniques are employed:
GPC-IR Method
Gel Permeation Chromatography (GPC)

The gel permeation chromatographic system is either a Polymer Laboratories Model PL-210 or a Polymer Laboratories Model PL-220 instrument. The column and carousel compartments are operated at 150° C. Four Polymer Laboratories 20-micron Mixed-A columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 200 microliters and the flow rate is 1.0 ml/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, *J. Polym. Sci., Polym. Let.*, 6, 621 (1968)): $M_{polyethylene}=0.431(M_{polystyrene})$.

Polyetheylene equivalent molecular weight calculations are performed using Viscotek TriSEC software Version 3.0.

Molecular Weight-Comonomer Composition Measurement by Infra-Red Detector

The comonomer composition throughout the GPC curve can be measured using an IR4 infra-red detector that is available from Polymer Char, Valencia, Spain (http://www.polymerchar.com/).

The "composition mode" of the detector is equipped with a measurement sensor ($CH_2$) and composition sensor ($CH_3$) that are fixed narrow band infra-red filters in the region of 2800-3000 $cm^{-1}$. The measurement sensor detects the methylene ($CH_2$) carbons on the polymer (which directly relates to the polymer concentration in solution) while the composition sensor detects the methyl ($CH_3$) groups of the polymer. The mathematical ratio of the composition signal ($CH_3$) divided by the measurement signal ($CH_2$) is sensitive to the comonomer content of the measured polymer in solution and its response is calibrated with known ethylene alpha-olefin copolymer standards.

The detector when used with a GPC instrument provides both a concentration ($CH_2$) and composition ($CH_3$) signal response of the eluted polymer during the GPC process. A polymer specific calibration can be created by measuring the area ratio of the $CH_3$ to $CH_2$ for polymers with known comonomer content (preferably measured by NMR). The comonomer distribution of a polymer can be estimated by applying a reference calibration of the ratio of the areas for the individual $CH_3$ and $CH_2$ response (i.e. area ratio $CH_3/CH_2$ versus comonomer content).

By taking the ratio of the $CH_3/CH_2$ response at each elution volume, the response to the polymer's composition is measured. After applying the appropriate reference calibration, the composition response can be used to estimate the comonomer amount at each elution volume. Integration of the entire GPC profile provides the average comonomer content of the polymer while the slope of the line from the comonomer versus molecular weight provides an indication of the uniformity of the comonomer distribution. When integrating the GPC chromatograph for composition determination, the integration region should be set to be greater than 5 weight percent of the polymer on either end of the chromatogram.

The application of infra-red spectroscopy to measure the comonomer content of polymers in this system is similar in principle to GPC/FTIR systems as described in the following references:

Markovich, Ronald P.; Hazlitt, Lonnie G.; Smith, Linley; "Development of gel-permeation chromatography-Fourier transform infrared spectroscopy for characterization of ethylene-based polyolefin copolymers", *Polymeric Materials Science and Engineering* (1991), 65, 98-100.

Deslauriers, P. J.; Rohlfing, D. C.; Shieh, E. T.; "Quantifying short chain branching microstructures in ethylene-1-olefin copolymers using size exclusion chromatography and Fourier transform infrared spectroscopy (SEC-FTIR)", *Polymer* (2002), 43, 59-170.

DSC Standard Method

Differential Scanning Calorimetry results are determined using a TAI model Q1000 DSC equipped with an RCS cooling accessory and an autosampler. A nitrogen purge gas flow of 50 ml/min is used. The sample is pressed into a thin film and melted in the press at about 175° C. and then air-cooled to room temperature (25° C.). 3-10 mg of material is then cut into a 6 mm diameter disk, accurately weighed, placed in a light aluminum pan (ca 50 mg), and then crimped shut. The thermal behavior of the sample is investigated with the following temperature profile. The sample is rapidly heated to 180° C. and held isothermal for 3 minutes in order to remove any previous thermal history. The sample is then cooled to −40° C. at 10° C./min cooling rate and held at −90° C. for 3 minutes. The sample is then heated to 180° C. at 10° C./min. heating rate. The cooling and second heating curves are recorded.

The DSC melting peak is measured as the maximum in heat flow rate (W/g) with respect to the linear baseline drawn between −30° C. and end of melting. The heat of fusion is measured as the area under the melting curve between −30° C. and the end of melting using a linear baseline.

Density

Samples for density measurement are prepared according to ASTM D 1928. Measurements are made within one hour of sample pressing using ASTM D792, Method B.

Melt Index

Melt index, or $I_2$, is measured in accordance with ASTM D 1238, Condition 190° C./2.16 kg. Melt index, or $I_{10}$ is also measured in accordance with ASTM D 1238, Condition 190° C./10 kg.

Mooney Viscosity

Mooney viscosity is measured in accordance with ASTM D1646-06 at 125° C., ML 1+4 (MU)).

ATREF

Analytical temperature rising elution fractionation (ATREF) analysis is conducted according to the method described in U.S. Pat. No. 4,798,081 and Wilde, L.; Ryle, T. R.; Knobeloch, D. C.; Peat, I. R.; *Determination of Branching Distributions in Polyethylene and Ethylene Copolymers*, J. Polym. Sci., 20, 441-455 (1982), which are incorporated by reference herein in their entirety. The composition to be analyzed is dissolved in ortho-dichlorobenzene and allowed to crystallize in a column containing an inert support (stainless steel shot) by slowly reducing the temperature to −10° C. at a cooling rate of 0.1° C./min. The column is equipped with an infrared detector. An ATREF chromatogram curve is then generated by eluting the crystallized polymer sample from the column by slowly increasing the temperature of the eluting solvent (ortho-dichlorobenzene) from −10 to 130° C. at a rate of 1.5° C./min.

$^{13}C$ NMR Analysis

The samples are prepared by adding approximately 3 g of a 50/50 mixture of tetrachloroethane-$d^2$/orthodichlorobenzene to 0.4 g sample in a 10 mm NMR tube. The samples are dissolved and homogenized by heating the tube and its contents to 150° C. The data are collected using a JEOL Eclipse™ 400 MHz spectrometer or a Varian Unity Plus™ 400 MHz spectrometer, corresponding to a $^{13}C$ resonance frequency of 100.5 MHz. The data are acquired using 4000 transients per data file with a 6 second pulse repetition delay. To achieve minimum signal-to-noise for quantitative analysis, multiple data files are added together. The spectral width is 25,000 Hz with a minimum file size of 32K data points. The samples are analyzed at 130° C. in a 10 mm broad band probe. The comonomer incorporation is determined using Randall's triad method (Randall, J. C.; JMS-Rev. Macromol. Chem. Phys., C29, 201-317 (1989), which is incorporated by reference herein in its entirety.

Polymer Fractionation by TREF

Large-scale TREF fractionation is carried by dissolving 15-20 g of polymer in 2 liters of ortho-dichlorobenzene by stirring for 4 hours at 160° C. The polymer solution is forced by 15 psig (100 kPa) nitrogen onto a 3 inch by 4 foot (7.6 cm×12 cm) steel column packed with a 60:40 (v:v) mix of 30-40 mesh (600-425 µm) spherical, technical quality glass beads (available from Potters Industries, HC 30 Box 20, Brownwood, Tex., 76801) and stainless steel, 0.028" (0.7 mm) diameter cut wire shot (available from Pellets, Inc. 63 Industrial Drive, North Tonawanda, N.Y., 14120). The column is immersed in a thermally controlled oil jacket, set initially to 160° C. The column is first cooled ballistically to 125° C., then slow cooled to −10° C. at 0.04° C. per minute and held for one hour. Fresh ortho-dichlorobenzene is introduced at about 65 ml/min while the temperature is increased at 0.167° C. per minute.

Approximately 2000 ml portions of eluant from the preparative TREF column are collected in a 16 station, heated fraction collector. The polymer is concentrated in each fraction using a rotary evaporator until about 50 to 100 ml of the polymer solution remains. The concentrated solutions are allowed to stand overnight before adding excess methanol, filtering, and rinsing (approx. 300-500 ml of methanol including the final rinse). The filtration step is performed on a 3 position vacuum assisted filtering station using 5.0 µm polytetrafluoroethylene coated filter paper (available from Osmonics Inc., Cat# Z50WP04750). The filtrated fractions are dried overnight in a vacuum oven at 60° C. and weighed on an analytical balance before further testing.

Turbidity

Turbidity of the oil or solvent solutions were measured using a HACH RATIO Turbidimeter Model 18900 using the 0-20 NTU resolution scale (+/−0.1 NTU).

Methods for Targeting the Composition in Inventive Examples

The block architecture of the inventive copolymers may be controlled by the proper selection of catalysts to produce the desired comonomer content in each of the segments at the reactor conditions. The amount of comonomer incorporated into each segment type may be predicted by independently performing polymerization tests employing single catalysts. Thus, using the case of an ethylene/propylene copolymer, the ratio of propylene to ethylene concentrations in the reactor ($[C_3]/[C_2]$) determines the amount of propylene (relative to ethylene) incorporated by each catalyst. Upon introduction of the chain shuttling agent, a 'blocky' structure is produced by statistical coupling of the polymer segments produced by each catalyst type. The total comonomer incorporated into the polymer is then controlled by the ratio of catalyst $A_1$ to catalyst $A_2$. This concept of production and methodology is explained in Arriola et al., "Catalytic Production of Olefin Block Copolymers via Chain Shuttling Polymerization", Science, 312 (2006).

From the above methodology, the wt % ethylene or propylene incorporated into the polymer by catalyst A1, the wt % ethylene or propylene incorporated into the polymer by catalyst A2, and the amount of polymer produced by each of the catalysts can be estimated from the reactor conditions and the overall comonomer content of the polymer.

The total/overall monomer or comonomer incorporated into the polymer can be estimated as follows:

Overall Comonomer Incorporated=$M_{Overall}=X_A M_A + X_B M_B$

Where $M_{Overall}$=Overall wt % $C_2$ incorporated in whole polymer
$M_A$=wt % $C_2$ incorporated in segment by Catalyst A1
$M_B$=wt % $C_2$ incorporated in segment by Catalyst A2
$X_A$=weight fraction of segment produced by Catalyst A1
$X_B$=weight fraction of segment produced by Catalyst A2
Note: $X_A + X_B = 1$ Using the total monomer or comonomer incorporated into the polymer as measured by FTIR or NMR, and knowing the comonomer concentration of each segment type in the reactor at the time of production, the weight fraction of polymer produced by each catalyst can be determined:

Weight fraction of segment produced by Catalyst A1

$$X_A = \frac{M_{Overall} - M_B}{M_A - M_B}$$

Weight fraction of segment produced by Catalyst A2 $X_B = 1 - X_A$

Other analytical methods to confirm the composition of the segments include but are not necessarily limited to DSC, NMR, and the subsequent analysis of polymer fractions obtained by polymer fractionation (temperature fractionation, solvent fractionation, molecular weight fractionation). Additionally, a technique such as high temperature liquid chromatography as described in Albrecht et al. "Separation and Characterization of Ethylene-Propylene Copolymers by High-Temperature Gradient HPLC Coupled to FTIR Spectroscopy", Macromol. Symp., 257, 46-55 (2007) could also be used. For any of these methods, the composition of the exemplary block copolymers may be estimated with the appropriate calibrations based on the random copolymers produced by a similar catalyst system and within the same range of molecular weights and overall compositions.

Catalysts

The term "overnight", if used, refers to a time of approximately 16-18 hours, the term "room temperature", refers to a temperature of 20-25° C., and the term "mixed alkanes" refers to a commercially obtained mixture of $C_{6-9}$ aliphatic hydrocarbons available under the trade designation Isopar E®, from ExxonMobil Chemical Company. In the event the name of a compound herein does not conform to the structural representation thereof, the structural representation shall control. The synthesis of all metal complexes and the preparation of all screening experiments were carried out in a dry nitrogen atmosphere using dry box techniques. All solvents used were HPLC grade and were dried before their use.

MMAO refers to modified methylalumoxane, a triisobutylaluminum modified methylalumoxane available commercially from Akzo-Nobel Corporation.

The preparation of catalyst (A5) is conducted as follows. The bis-imine, 3-(2,6-diisopropylphenylimino)butan-2-ylidene-2,6-diisopropylbenzenamine, is synthesized according to procedures published in WO2003/051935.

a) Synthesis of N-(3-(2,6-diisopropylphenylamino)-3-methylbutan-2-ylidene)-2,6-diisopropylbenzenamine In a nitrogen-filled glovebox, the above referenced bis-imine (6.48 g, 16.0 mmol) is dissolved in toluene (50 mL) and trimethylaluminum (9.61 mL, 19.2 mmol) is added dropwise. After stirring for one hour at room temperature, the reaction mixture is removed from the glovebox, and water (10 mL) is added very slowly under nitrogen purge. The mixture bubbles violently, and the color slowly turns from yellow to colorless as a white precipitate develops. The mixture is filtered to remove insoluble aluminum salts. The organic layer from the filtrate is separated and the aqueous layer is washed with ether (100 mL). The combined organic fractions are dried over $MgSO_4$ and filtered, then volatiles are removed in vacuo to yield 6.55 g (73.6%) of a colorless solid.

b) Synthesis of 3-(2,6-diisopropylphenylamino)-3-methylbutan-2-one

The product of the previous reaction (17.45 g, 41.5 mmol) is dissolved in ethanol (200 mL). Water (65 mL) is added, precipitating a white solid. Over a 60 minute period, sulfuric acid (1.0 M, 150 mL, 150 mmol) is added via dropping funnel while stirring the reaction mixture. During the reaction, the solid dissolves to form a pale yellow solution, which is heated at reflux temperature for one hour, then allowed to cool to room temperature. Potassium hydroxide pellets (~20 g) are added slowly, while monitoring pH. Just after the endpoint (pH ~11), the product is extracted with ether (2×150 mL), washed with brine, dried over $MgSO_4$, and filtered. As the solvent is removed by evaporation, a white precipitate forms. This is collected and washed with cold pentane. Yield=1.75 g. The remaining solution is dissolved in pentane (100 mL), washed with brine to remove residual water, dried over $MgSO_4$, filtered and evaporated to about 30 mL. Additional white solid precipitates upon cooling. Yield=1.41 g. Total yield=3.16 g (29.1%).

c) Synthesis of 2,6-diisopropyl-N-(2-methyl-3-(octylimino)butan-2-yl)benzenamine The product of the previous reaction (1.500 g, 5.74 mmol) is dissolved in toluene (15 mL) in a 25 mL round-bottom flask, and octylamine (1.00 mL, 6.03 mmol) is added. A very small amount (ca 1 mg) of p-toluenesulfonic acid is added and the mixture is heated at reflux temperature with a Dean-Stark condenser attached. After heating overnight, additional n-octylamine (2.00 mL, 12.1 mmol) is added and the reaction mixture is further heated to effect complete conversion. Water (5 mL) is added. The organic layer is separated, dried over MgSO4, filtered and then volatiles evaporated. 1.62 g (75.8%) of colorless viscous liquid is collected.

In a nitrogen-filled glovebox, the imino-amine ligand (5.548 g, 14.89 mmol) is dissolved in toluene (80 mL), and n-BuLi (1.6 M in hexanes, 10.2 mL, 16.4 mmol) is added. The clear yellow solution is stirred at room temperature for one hour, and then $HfCl_4$ (4.769 g, 14.89 mmol) is added. After stirring at room temperature for six hours, MeMgBr (3.0M in ether, 16.4 mL, 49.1 mmol) is added. Stirring is continued overnight as the color slowly progresses from light yellow to dark brown. Volatiles are removed from the reaction in vacuo, and hexanes (100 mL) are added. The mixture is stirred for 30 minutes, filtered and the solids are washed with additional hexanes (100 mL). Solvents are removed from the combined filtrates in vacuo to yield a light tan solid. Yield=6.472 g (73.0%).

Cocatalyst 1

A mixture of methyldi($C_{14-18}$alkyl)ammonium salts of tetrakis(pentafluorophenyl)borate (here-in-after armeenium borate), prepared by reaction of a long chain trialkylamine (Armeen™ M2HT, available from Akzo-Nobel, Inc.), HCl and $Li[B(C_6F_5)_4]$, substantially as disclosed in U.S. Pat. No. 5,919,9883, Ex. 2.

Cocatalyst 2

Mixed $C_{14-18}$ alkyldimethylammonium salt of bis(tris(pentafluorophenyl)-alumane)-2-undecylimidazolide, prepared according to U.S. Pat. No. 6,395,671, Ex. 16.

Shuttling Agents

The shuttling agents employed include diethylzinc (DEZ, SA1), di(i-butyl)zinc (SA2), di(n-hexyl)zinc (SA3), triethylaluminum (TEA, SA4), trioctylaluminum (SA5), triethylgallium (SA6), i-butylaluminum bis(dimethyl(t-butyl)siloxane) (SA7), i-butylaluminum bis(di(trimethylsilyl)amide) (SA8), n-octylaluminum di(pyridine-2-methoxide) (SA9), bis(n-octadecyl)i-butylaluminum (SA10), i-butylaluminum bis(di(n-pentyl)amide) (SA11), n-octylaluminum bis(2,6-di-t-butylphenoxide) (SA12), n-octylaluminum di(ethyl(1-naphthyl)amide) (SA13), ethylaluminum bis(t-butyldimethylsiloxide) (SA14), ethylaluminum di(bis(trimethylsilyl)amide) (SA15), ethylaluminum bis(2,3,6,7-dibenzo-1-azacycloheptaneamide) (SA16), n-octylaluminum bis(2,3,6,7-dibenzo-1-azacycloheptaneamide) (SA17), n-octylaluminum bis(dimethyl(t-butyl)siloxide(SA18), ethylzinc (2,6-diphenylphenoxide) (SA19), and ethylzinc (t-butoxide) (SA20).

Examples 1-16

Comparative Examples A, B, E and F

Continuous solution polymerizations are carried out in a computer controlled autoclave reactor equipped with an internal stirrer. Purified mixed alkanes solvent (Isopar™ E available from ExxonMobil Chemical Company), ethylene at 2.70 lbs/hour (1.22 kg/hour), propylene, and hydrogen (where used) are supplied to a 3.8 L reactor equipped with a jacket for temperature control and an internal thermocouple. The solvent feed to the reactor is measured by a mass-flow controller. A variable speed diaphragm pump controls the solvent flow rate and pressure to the reactor. At the discharge of the pump, a side stream is taken to provide flush flows for the catalyst and cocatalyst and SA1 injection lines and the reactor agitator. These flows are measured by Micro-Motion mass flow meters and controlled by control valves or by the manual adjustment of needle valves. The remaining solvent is combined with propylene, ethylene, and hydrogen (where used) and fed to the reactor. A mass flow controller is used to deliver hydrogen to the reactor as needed. The temperature of the solvent/monomer solution is controlled by use of a heat exchanger before entering the reactor. This stream enters the bottom of the reactor. The catalyst component solutions are metered using pumps and mass flow meters and are combined with the catalyst flush solvent and introduced into the bottom of the reactor. The reactor is run liquid-full at 500 psig (3.45 MPa) with vigorous stirring. Product is removed through exit lines at the top of the reactor. All exit lines from the reactor are steam traced and insulated. Polymerization is stopped by the addition of a small amount of water into the exit line along with any stabilizers or other additives and passing the mixture through a static mixer. The product stream is then heated by passing through a heat exchanger before devolatilization. The polymer product is recovered by extrusion using a devolatilizing extruder and water cooled pelletizer. Process details and results are contained in Table 1. For comparative examples A, B, E and F no shuttling agent was introduced into the reactor.

Selected polymer properties are provided in Table 2. Comparative Example C is Paratone 8941 (ExxonMobil Chemical Co.) and Comparative Example D is Nordel IP 225 (The Dow Chemical Company).

TABLE 1

Process details for preparation of exemplary polymers

| Ex. | $C_2H_4$ kg/hr | $C_3H_6$ kg/hr | Solv. kg/hr | $H_2$ sccm[1] | T °C. | Cat A1[2] ppm | Cat A1 Flow kg/hr | Cat A5[3] ppm | Cat A5 Flow Kg/hr | DEZ Conc ppm Zn | DEZ Flow kg/hr | Cocat Conc. ppm | Cocat Flow kg/hr | $[C_2H_4]/$ $[DEZ]$[4] | Poly Rate[5] kg/hr | Conv % | Solids % | Eff.[7] |
|---|---|---|---|---|---|---|---|---|---|---|---|---|---|---|---|---|---|---|
| A* | 1.48 | 1.5 | 10.5 | 109.9 | 120.0 | 64.2 | 0.090 | 19.8 | 0.198 | — | — | 573.7 | 0.065 | — | 1.2 | 85.1 | 9.2 | 0.17 |
| B* | 1.04 | 1.4 | 10.0 | 99.9 | 100.0 | 19.8 | 0.055 | 61.1 | 0.019 | — | — | 427.3 | 0.040 | — | 1.2 | 92.0 | 9.2 | 0.51 |
| E* | 1.04 | 1.5 | 22.0 | 2.1 | 100.0 | 19.8 | 0.168 | 18.9 | 0.038 | — | — | 427.3 | 0.069 | — | 1.2 | 89.4 | 9.2 | 0.33 |
| 1 | 1.48 | 1.5 | 10 | 0.0 | 119.9 | 64.2 | 0.090 | 19.8 | 0.197 | 4001 | 0.105 | 573.7 | 0.058 | 1027.3 | 1.2 | 83.7 | 9.2 | 0.17 |
| 2 | 1.04 | 1.3 | 10.0 | 1.0 | 99.8 | 19.8 | 0.067 | 61.1 | 0.023 | 3017 | 0.102 | 427.3 | 0.051 | 767.6 | 1.2 | 90.2 | 9.1 | 0.42 |
| 3 | 1.04 | 1.3 | 10.0 | 1.0 | 100.0 | 19.8 | 0.066 | 61.1 | 0.023 | 3017 | 0.073 | 427.3 | 0.051 | 1158.5 | 1.1 | 89.5 | 9.1 | 0.42 |
| 4 | 1.28 | 1.3 | 12.0 | 89.9 | 100.0 | 19.2 | 0.023 | 51.9 | 0.112 | 2431 | 0.045 | 946.4 | 0.052 | 1523.8 | 1.5 | 93.1 | 13.2 | 0.24 |
| 5 | 1.05 | 1.7 | 9.9 | 0.0 | 120.0 | 53.1 | 0.013 | 59.2 | 0.253 | 3030 | 0.104 | [8] | [8] | 536.9 | 3.7 | 92.9 | — | 0.30 |
| 6 | 1.05 | 1.8 | 10.0 | 0.0 | 120.0 | 53.1 | 0.017 | 59.2 | 0.230 | 3030 | 0.100 | [8] | [8] | 907.3 | 3.2 | 88.8 | — | 0.25 |

TABLE 1-continued

Process details for preparation of exemplary polymers

| Ex. | C₂H₄ kg/hr | C₃H₆ kg/hr | Solv. kg/hr | H₂ sccm[1] | T °C. | Cat A1[2] ppm | Cat A1 Flow kg/hr | Cat A5[3] ppm | A5 Flow Kg/hr | DEZ Conc ppm Zn | DEZ Flow kg/hr | Cocat Conc. ppm | Cocat Flow kg/hr | [C₂H₄]/ [DEZ][4] | Poly Rate[5] kg/hr | Conv % | Solids % | Eff.[7] |
|---|---|---|---|---|---|---|---|---|---|---|---|---|---|---|---|---|---|---|
| 7 | 1.09 | 1.8 | 10.0 | 43.3 | 120.0 | 53.1 | 0.018 | 59.2 | 0.229 | 3030 | 0.052 | [8] | [8] | 1478.8 | 3.5 | 90.5 | — | 0.26 |
| 8 | 1.00 | 1.6 | 10.1 | 0.0 | 120.0 | 53.1 | 0.018 | 59.2 | 0.229 | 3030 | 0.102 | [8] | [8] | 873.9 | 3.2 | 89.4 | — | 0.29 |
| 9 | 1.08 | 1.8 | 9.7 | 0.0 | 120.0 | 53.1 | 0.018 | 59.2 | 0.230 | 3030 | 0.097 | [8] | [8] | 633.6 | 3.6 | 92.0 | — | 0.23 |
| 10 | 1.02 | 1.7 | 10.0 | 0.0 | 119.9 | 53.1 | 0.025 | 59.2 | 0.209 | 3030 | 0.098 | [8] | [8] | 893.1 | 3.3 | 89.5 | — | 0.21 |
| 11 | 1.04 | 1.5 | 22.0 | 2.5 | 100.1 | 19.8 | 0.161 | 18.9 | 0.041 | 3017 | 0.096 | 427.3 | 0.067 | 863.7 | 1.2 | 89.7 | 9.4 | 0.34 |
| 12 | 1.04 | 1.5 | 22.0 | 2.1 | 99.9 | 19.8 | 0.175 | 18.9 | 0.040 | 3017 | 0.150 | 427.3 | 0.070 | 598.9 | 1.2 | 88.9 | 9.5 | 0.30 |
| 13 | 1.04 | 2.1 | 22.0 | 2.4 | 100.0 | 19.8 | 0.139 | 18.9 | 0.063 | 3017 | 0.096 | 427.3 | 0.062 | 962.2 | 1.1 | 88.5 | 8.5 | 0.34 |
| F* | 0.87 | 1.4 | 15.2 | 110.9 | 100.0 | 13.4 | 0.103 | 13.0 | 0.184 | — | — | 427.3 | 0.079 | — | 1.05 | 88.9 | 5.9 | 0.284 |
| 14 | 0.87 | 1.4 | 15.2 | 73.9 | 100.0 | 13.4 | 0.114 | 13.0 | 0.218 | 990.8 | 0.046 | 382.4 | 0.091 | 4615 | 1.09 | 89.6 | 6.1 | 0.258 |
| 15 | 0.87 | 1.4 | 15.2 | 58.6 | 100.0 | 13.4 | 0.111 | 30.4 | 0.091 | 990.8 | 0.084 | 382.4 | 0.088 | 2531 | 1.09 | 89.5 | 6.1 | 0.257 |
| 16 | 0.87 | 1.4 | 15.2 | 3.0 | 100.0 | 13.4 | 0.108 | 30.4 | 0.089 | 1987 | 0.077 | 382.4 | 0.086 | 1371 | 1.09 | 89.7 | 6.1 | 0.262 |

*Comparative, not an example of the invention
[1] standard cm³/min
[2] [N-(2,6-di(1-methylethyl)phenyl)amido)(2-isopropylphenyl)(α-naphthalen-2-diyl(6-pyridin-2-diyl)methane)]hafnium dimethyl
[3] [η²-2,6-diisopropyl-N-(2-methyl-3-(octylimino)butan-2-yl)benzenamide]trimethylhafnium
[4] molar ratio in reactor
[5] polymer production rate
[6] percent ethylene conversion in reactor
[7] efficiency, kg polymer/mg M where mg M = mg Hf (A1) + mg Hf (A5)
[8] A Cocat/(Cat A1 + Cat A5) molar ratio of 1.2 was maintained.

FTIR measurements were made using according to ASTM D-3900-05 to estimate the total weight percent of ethylene present. Alternatively, the measurement could also be made by NMR.

$T_m$ vs wt % $C_2$

When the inventive polymers comprise a majority of hard segments, they have melting temperatures that are higher than those of comparative random copolymers for a given weight percent of ethylene, based on the weight of the polymer. A calibration line may be obtained for any given comonomer. This relationship for propylene as a comonomer is shown in FIG. 1, wherein it can be seen that the numerical values for the melt temperatures for a given weight percent ethylene have the following relationship:

$$Tm \geq 4.1276(wt\% \ C_2) - 244.76.$$

Table 3 shows the data corresponding to FIG. 1.

TABLE 3

| Example | $T_m$ | Wt % $C_2$ |
|---|---|---|
| 1 | 70.25 | 71.4 |
| A* | 62.3 | 71.7 |
| 2 | 45 | 71 |
| 3 | 37 | 71 |
| B* | 39 | 70.9 |
| 11 | 38 | 66.5 |
| E* | 58 | 67.1 |
| 12 | 48 | 65 |
| 4 | 65 | 69 |

*Comparative, not an example of the invention

Figure 2:
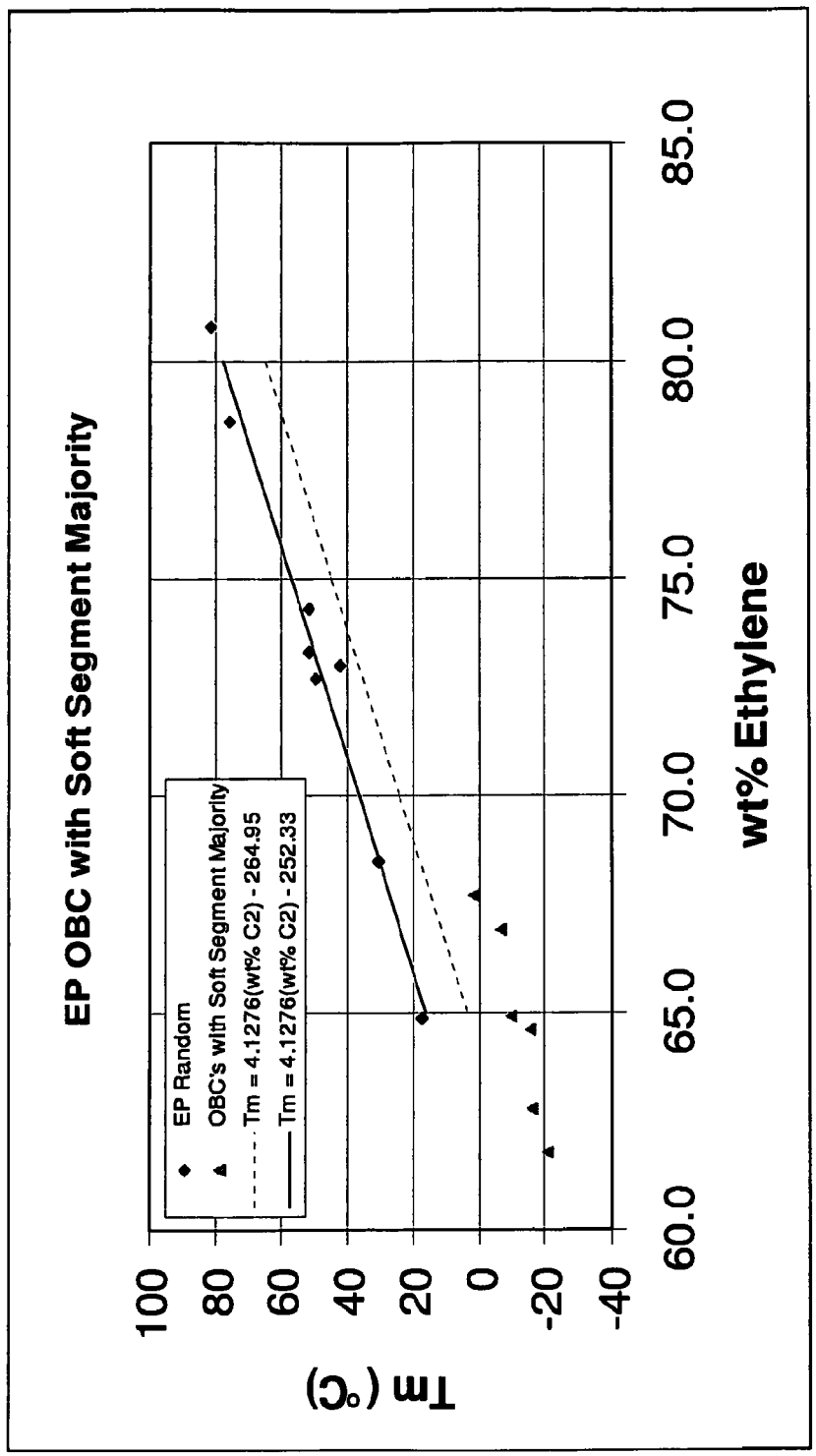
FIG. 2 shows a plot of $T_m$ vs wt % $C_2$ for soft segment majority copolymers of the invention and for Comparative Examples.

When the inventive polymers comprise a majority of soft segments, they have melting points that are lower than those of comparative random copolymers for a given weight percent of ethylene, based on the weight of the polymer. This relationship for propylene as the comonomer is shown in FIG. 2, wherein it can be seen that the numerical values for the melt temperatures for a given weight percent ethylene have the following relationship:

$$Tm \leq 4.1276(wt\% \ C_2) - 264.95.$$

TABLE 4

| Example | $T_m$ | Wt % $C_2$ |
|---|---|---|
| 6 | -9.9 | 64.9 |
| 7 | -15.8 | 64.6 |
| 8 | 1.5 | 67.7 |
| 9 | -20.8 | 61.8 |
| 10 | -6.5 | 66.9 |
| 5 | -16.1 | 62.8 |

Methods for Targeting the Composition in Inventive Examples

The block architecture of the exemplary OBC's is controlled by the proper selection of catalysts to produce the desired propylene content in each of the segments at the reactor conditions. The amount of comonomer incorporated into each segment type can be predicted by independently performing polymerization tests employing single catalysts. Thus, the ratio of propylene to ethylene concentrations in the reactor ([C3]/[C2]) determines the amount of propylene (relative to ethylene) incorporated by each catalyst. Upon introduction of the chain shuttling agent, a 'blocky' structure is produced by statistical coupling of the polymer segments produced by each catalyst type. The total comonomer incorporated into the polymer is then controlled by the ratio of catalyst $A_1$ to catalyst $A_2$. This concept of production and methodology is explained in Arriola et al., "Catalytic Production of Olefin Block Copolymers via Chain Shuttling Polymerization", Science, 312 (2006).

From the above methodology, the wt % ethylene or propylene incorporated into the polymer by catalyst A1, the wt % ethylene or propylene incorporated into the polymer by catalyst A2, and the amount of polymer produced by each of the catalysts can be estimated from the reactor conditions and the overall comonomer content of the polymer.

The total/overall monomer or comonomer incorporated into the polymer can be estimated as follows:

$$\text{Overall Comonomer Incorporated} = M_{Overall} = X_A M_A + X_B M_B$$

Where
$M_{Overall}$=Overall wt % C2 incorporated in whole polymer
$M_A$=wt % C2 incorporated in segment by Catalyst A1
$M_B$=wt % C2 incorporated in segment by Catalyst A2
$X_A$=weight fraction of segment produced by Catalyst A1
$X_B$=weight fraction of segment produced by Catalyst A2
Note: $X_A+X_B=1$ Using the total monomer or comonomer incorporated into the polymer as measured by FTIR or NMR, and knowing the comonomer concentration of each segment type in the reactor at the time of production, the weight fraction of polymer produced by each catalyst can be determined.

Weight fraction of segment produced by Catalyst A1

$$X_A = \frac{M_{Overall} - M_B}{M_A - M_B}$$

Weight fraction of segment produced by Catalyst A2
$X_B = 1 - X_A$

Other analytical methods to confirm the composition of the segments comprise DSC, NMR, and the subsequent analysis of polymer fractions obtained by polymer fractionation (temperature fractionation, solvent fractionation, molecular weight fractionation). Additionally, a technique such as high temperature liquid chromatography as described in Albrecht et al. "Separation and Charactierization of Ethylene-Propylene Copolymers by High-Temperature Gradient HPLC Coupled to FTIR Spectroscopy", Macromol. Symp., 257, 46-55 (2007) could also be used. For any of these methods, the composition of the exemplary block copolymers can be estimated with the appropriate calibrations based on the random copolymers produced by a similar catalyst system and within the same range of molecular weights and overall compositions.

TABLE 5

Targeted Block Copolymer Compositions of exemplary polymers

| Ex. | Ethylene (wt %) FTIR | Ethylene (wt %) NMR | Wt % C2 Incorporation for Cat A1[1] | Wt % C2 Incorporation for Cat A2[2] | Wt Hard % polymer made from Cat A1[1] |
|---|---|---|---|---|---|
| A* | 71.7 | — | — | — | 40 |
| B* | 70.9 | — | 75 | 58 | 70 |
| C* | 62.4 | — | NA | NA | NA |
| D* | 70.5 | — | NA | NA | NA |
| E* | 67.1 | — | 75 | 58 | 50 |
| 1 | 71.4 | — | — | — | 40 |
| 2 | 71.5 | — | 75 | 58 | 70 |
| 3 | 71.2 | — | 75 | 58 | 70 |
| 4 | 69.0 | — | 75 | 58 | 65 |
| 5 | 62.8 | — | — | — | 15 |
| 6 | 64.9 | — | — | — | 22 |
| 7 | 64.6 | — | — | — | 22 |
| 8 | 67.7 | — | — | — | 22 |
| 9 | 61.8 | — | — | — | 22 |
| 10 | 66.9 | — | — | — | 30 |
| 11 | 66.5 | — | 75 | 58 | 50 |
| 12 | 66.8 | — | 75 | 58 | 50 |
| 13 | 62.3 | — | 75 | 58 | 50 |
| F* | 69.7 | 71.1 | 75 | 58 | 65 |
| 14 | 68.8 | 68.7 | 75 | 58 | 65 |
| 15 | 69.0 | 69.0 | 75 | 58 | 65 |
| 16 | 69.6 | 70.0 | 75 | 58 | 65 |

Figure 3:
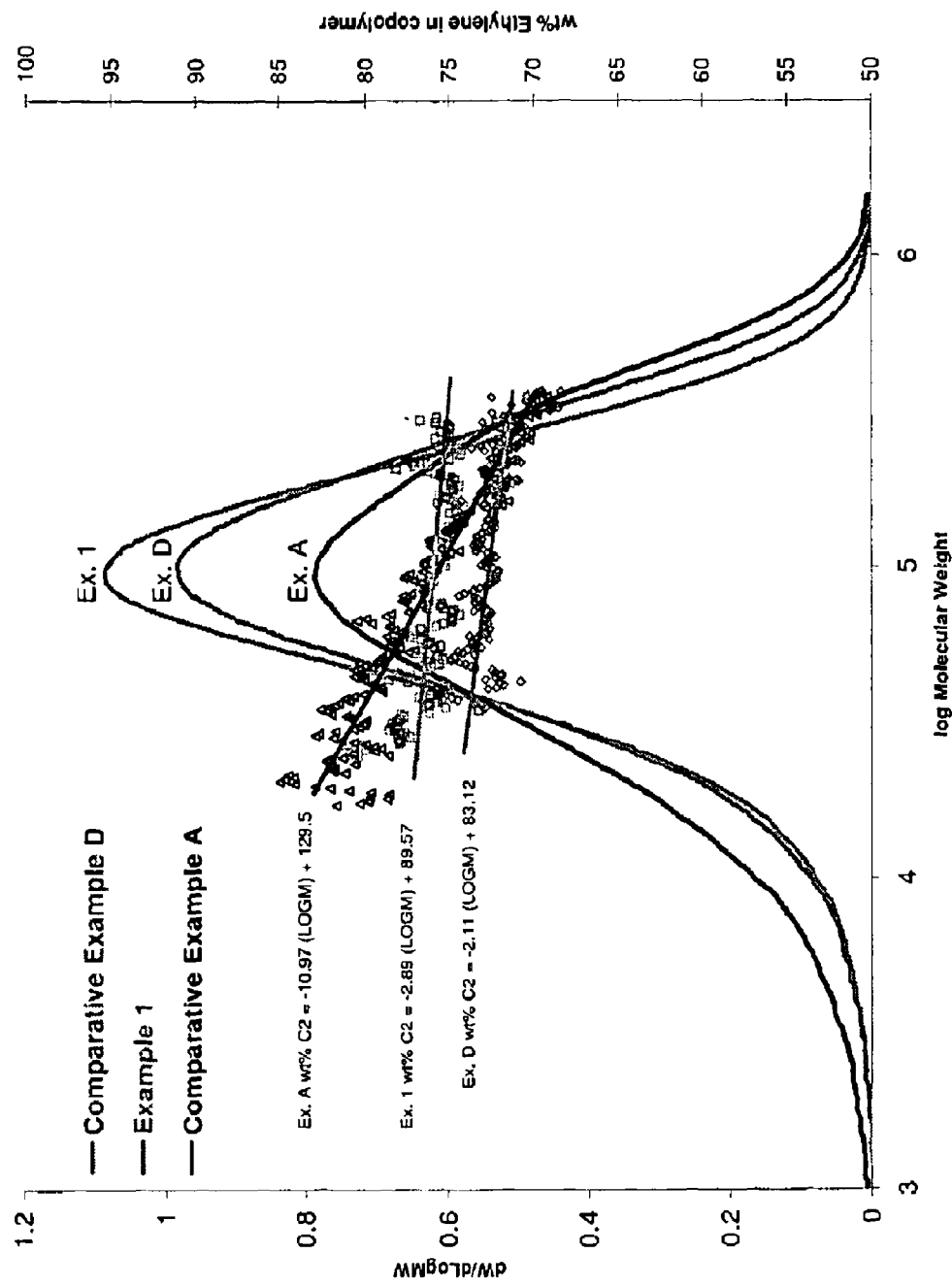
FIG. 3 shows a plot of GPC-IR data for Example 1 and Comparatives A and D.

[1][N-(2,6-di(1-methylethyl)phenylamido)(2-isopropylphenyl)(α-naphthalen-2-diyl(6-pyridin-2-diyl)methane)]hafnium dimethyl
[2][η²-2,6-diisopropyl-N-(2-methyl-3-(octylimino)butan-2-yl)benzenamide]trimethyl-hafnium GPC-IR and Turbidity Measurements Ethylene content throughout the GPC curve was monitored via GPC-IR. The numerical values of the ethylene content in wt % ethylene based on weight of polymer vs molecular weight fractions were plotted and fitted to a line, mx+b. The absolute slope, |m|, and turbidities in oil and dodecane are given in Table 4 below. As may be seen, for the inventive polymers, |m| is less than 4 and the turbidity is equal to or less than that of a polymer with a comparable DSC enthalpy, J/g, at greater than 55° C., $\Delta H_{>55°C}$, within ±5 J/g. An example of GPC-IR plots with corresponding lines and equation giving the slope, m, is given in FIG. 3. Turbidity in oil is measured for a 1 wt % solution of polymer, based on the weight of oil and turbidity in dodecane is measured for a 1.5 wt % solution of polymer, based on the weight of dodecane.

TABLE 6

| Ex. | $\Delta H_{>55°C.}$ | |m| | Turbidity (oil) | Turbidity (dodecane) |
|---|---|---|---|---|
| A* | 18 | 10.1 | 10.5 | 20 |
| B* | 5.3 | 5.1 | 2.1 | 6.5 |
| C* | 2.4 | 6.3 | 3.1 | 2.4 |
| D* | NM | 1.3 | NM | NM |
| 1 | 18.5 | 2.9 | 2.9 | 11.8 |
| 2 | 9.9 | 2.4 | 1.8 | 2 |
| 3 | 5.2 | NM | 2.9 | NM |
| 4 | 10.4 | 0.54 | 2.5 | 6.7 |
| 6 | 0.4 | NM | 0.8 | NM |
| 5 | 0.8 | NM | 0.7 | NM |
| 7 | NM | NM | NM | NM |
| 8 | 0.5 | NM | NM | NM |
| 9 | 0 | NM | NM | NM |
| 11 | 1.3 | 0.94 | 1.5 | NM |
| E* | 4.2 | 7.2 | 2.7 | NM |
| 12 | 1.1 | NM | 1.1 | NM |
| 13 | 0 | NM | 1.0 | NM |

*Comparative, not an example of the invention

While the invention has been described with respect to a limited number of embodiments, the specific features of one embodiment should not be attributed to other embodiments of the invention. No single embodiment is representative of all aspects of the invention. In some embodiments, the compositions or methods may include numerous compounds or steps not mentioned herein. In other embodiments, the compositions or methods do not include, or are substantially free of, any compounds or steps not enumerated herein. Variations and modifications from the described embodiments exist. Finally, any number disclosed herein should be construed to mean approximate, regardless of whether the word "about" or "approximately" is used in describing the number. The appended claims intend to cover all those modifications and variations as falling within the scope of the invention.

What is claimed is:

1. An ethylene/α-olefin interpolymer comprising a hard segment and a soft segment, wherein the ethylene/α-olefin interpolymer:

(a) has a Mw/Mn from about 1.7 to about 3.5;

(b) has an ethylene content in the hard segment in the range of from 70 wt % to 85 wt % based on total monomer content in hard segment;

(c) (i) has a hard segment composition of at least 40%, at least one melting point, Tm, in degrees Celsius and an amount of ethylene in weight percent, wt % $C_2$ based on total weight of the polymer, wherein the numerical values of Tm and wt % $C_2$ correspond to the relationship:

90° C.≥$Tm$≥4.1276(wt % $C_2$)−244.76; or (ii) has a hard segment composition of less than 40%, at least one melting point, Tm, in degrees Celsius and an amount of ethylene in weight percent, wt % $C_2$ based on total weight of the polymer, wherein the numerical values of Tm and wt % $C_2$ correspond to the relationship:

$$80°\text{C.} \geq Tm \leq 4.1276(\text{wt \% } C_2) - 264.95; \text{ or}$$

(iii) is characterized by an average block index greater than zero and up to about 1.0; or (iv) has a molecular fraction which elutes between 0° C. and 130° C. when fractionated using low temperature TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer; or (v) has a relationship between ethylene content in wt % and log molecular weight such that a line plotted of ethylene content vs log molecular weight as measured by GPC-IR has an absolute slope, m, of equal to or less than 4; and, (d) has a turbidity measurement of a 1.0 wt % solution of the ethylene/α-olefin interpolymer in oil or a 1.5 wt % solution in dodecane of less than or equal to that of a comparable copolymer wherein the comparable copolymer has the same DSC enthalpy (J/g) at greater than 55° C. within ±5 J/g, and the same overall ethylene content within 10%; and, wherein the soft segment comprises 35 wt % to 80 wt % comonomer based on total monomer content in the soft segment.

2. The ethylene/α-olefin interpolymer of claim 1 comprising ethylene in an amount in the range of from about 55 wt % to about 75 wt % based on total weight of the polymer.

3. The ethylene/α-olefin interpolymer of claim 1 comprising ethylene in an amount in the range of from about 60 wt % to about 73 wt % based on total weight of the polymer.

4. The ethylene/α-olefin interpolymer of claim 1 having a $T_m$ in the range of from about −25° C. to about 100° C.

5. The ethylene/α-olefin interpolymer of claim 1 having a $T_m$ in the range of from about 30° C. to about 80° C.

6. The ethylene/α-olefin interpolymer of claim 1 having a $T_m$ in the range of from about 35° C. to about 75° C.

7. The ethylene/α-olefin interpolymer of claim 1 having a $T_m$ that is less than that of a comparable random copolymer having a total weight percent comonomer within 10 wt % of that of the ethylene/α-olefin interpolymer.

8. The ethylene/α-olefin interpolymer of claim 1 having a turbidity in a 1.0 wt % solution of the ethylene/α-olefin interpolymer in oil or a 1.5 wt % solution in dodecane that is less than 1.5 NTU and a DSC enthalpy at greater than 55° C. of less than 2 J/g.

* * * * *